(12) United States Patent
Zahir et al.

(10) Patent No.: US 12,275,885 B2
(45) Date of Patent: Apr. 15, 2025

(54) DOPED PHASE CHANGE MATERIAL AND METHOD OF PREPARATION THEREOF

(71) Applicant: KING FAHD UNIVERSITY OF PETROLEUM AND MINERALS, Dhahran (SA)

(72) Inventors: Md. Hasan Zahir, Dhahran (SA); Kashif Irshad, Dhahran (SA); Amjad Ali, Dhahran (SA); Ridha Ben Ali Ben Mansour, Dhahran (SA); Hafiz Ali, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 21 days.

(21) Appl. No.: 17/864,056

(22) Filed: Jul. 13, 2022

(65) Prior Publication Data

US 2024/0018404 A1    Jan. 18, 2024

(51) Int. Cl.
*C09K 5/06*    (2006.01)

(52) U.S. Cl.
CPC .................... *C09K 5/063* (2013.01)

(58) Field of Classification Search
CPC .......... C09K 5/06; C09K 5/063; C01B 33/128
See application file for complete search history.

(56) References Cited

U.S. PATENT DOCUMENTS

| | | | |
|---|---|---|---|
| 9,493,695 B2* | 11/2016 | Ram | C08K 3/10 |
| 10,093,843 B2* | 10/2018 | Eliyahu | C09K 5/063 |
| 2012/0202695 A1* | 8/2012 | Toledano | A61K 9/5115 |
| | | | 424/490 |
| 2013/0270476 A1* | 10/2013 | Yang | C09K 5/063 |
| | | | 252/74 |
| 2019/0004369 A1* | 1/2019 | Pousthomis | G02F 1/133605 |

FOREIGN PATENT DOCUMENTS

| | | | | |
|---|---|---|---|---|
| CN | 1793277 | A | * | 6/2006 |
| CN | 101224984 | A | * | 7/2008 |
| CN | 101948674 | A | * | 1/2011 |
| CN | 101948674 | B | | 8/2013 |

(Continued)

OTHER PUBLICATIONS

Weng et al. ("Fabrication of high thermal conductive shape-stabilized polyethylene glycol/silica phase change composite by two-step sol gel method", Composites Part A, 110, 2018, 106-112) (Year: 2018).*

(Continued)

*Primary Examiner* — Matthew R Diaz
(74) *Attorney, Agent, or Firm* — Oblon, McClelland, Maier & Neustadt, L.L.P.

(57) ABSTRACT

A method includes mixing a dopant salt of at least one of cobalt, nickel, zinc, and scandium with a silicate, in a solvent, to form a first solution. The method includes mixing the first solution with a solvent mixture to form a second solution. The method further includes mixing the second solution with an acid to form an acid solution. The method further includes adding a catalyst and a polymer to the acid solution to form the doped PCM. The doped PCM includes the catalyst, the polymer, at least one of cobalt, nickel, zinc, and scandium, and $SiO_2$.

13 Claims, 23 Drawing Sheets

(56) References Cited

FOREIGN PATENT DOCUMENTS

| CN | 105062430 A | * | 11/2015 | |
|---|---|---|---|---|
| CN | 106045554 A | | 10/2016 | |
| CN | 106554754 A | * | 4/2017 | |
| CN | 106811179 A | * | 6/2017 | ............ C09K 5/063 |
| CN | 107603570 A | * | 1/2018 | |
| CN | 108624295 A | * | 10/2018 | ............ C09K 5/063 |
| CN | 106622140 B | | 5/2019 | |
| CN | 107011869 B | | 5/2019 | |
| CN | 107384328 B | | 6/2021 | |
| JP | 2006043495 A | * | 2/2006 | |
| KR | 2010070917 A | * | 6/2010 | |
| WO | WO-2020074883 A1 | * | 4/2020 | ............ C09K 5/063 |
| WO | 2021/191818 A1 | | 9/2021 | |

OTHER PUBLICATIONS

Serrano et al. ("Influence of gelation step for preparing PEG-SiO2 shape-stabilized phase change materials by sol-gel method", Journal of Sol-Gel Science and Technology, 2019, 89. 731-742) (Year: 2018).*

Pietrzyk et al. ("Antibacterial properties of Zn doped hydrophobic SiO2 coatings produced by sol-gel method", Coatings, 2019, 9, 362) (Year: 2019).*

Ethyl Silicates SIDS Initial Assessment Profile (SIAM 27, 2008, US/ICCA) (Year: 2008).*

Tetraethyl Orthosilicate (American Chemical Society Molecule of the Week) (Year: 2020).*

Serrano, et al. ; Influence of gelation step for preparing PEG-SiO2 shape-stabilized phase change materials by sol-gel method ; Journal of Sol-Gel Science and Technology 89 ; pp. 731-742 ; Nov. 12, 2018.

Weng, et al. ; Fabrication of high thermal conductive shape-stabilized polyethylene glycol/silica phase change composite by two-step sol get method ; Composites Part A: Applied Science and Manufacturing, vol. 110 ; pp. 106-112 ; Jul. 2018 ; Abstract Only ; 3 Pages.

Song, et al. ; Eco-friendly electrospun nanofibrous membranes with high thermal energy capacity and improved thermal transfer efficiency ; Renewable Energy, vol. 148 ; pp. 504-511 ; Apr. 2020 ; Abstract Only ; 3 Pages.

* cited by examiner

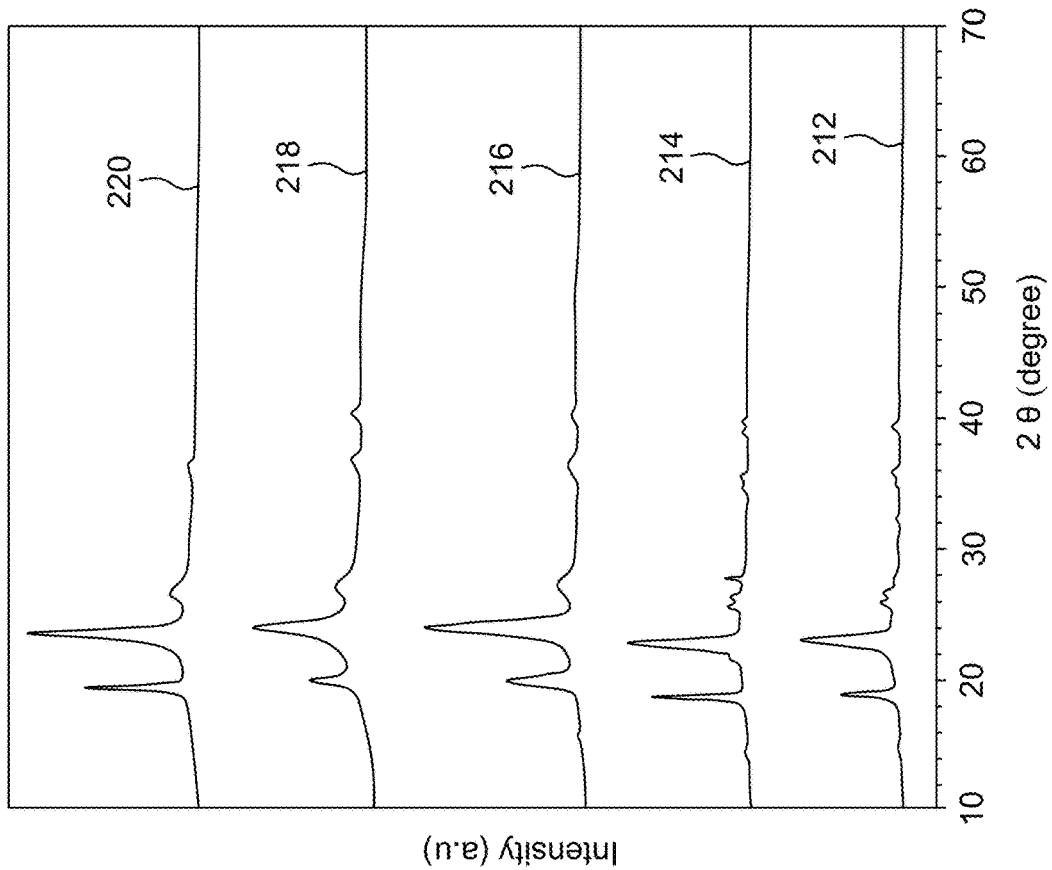
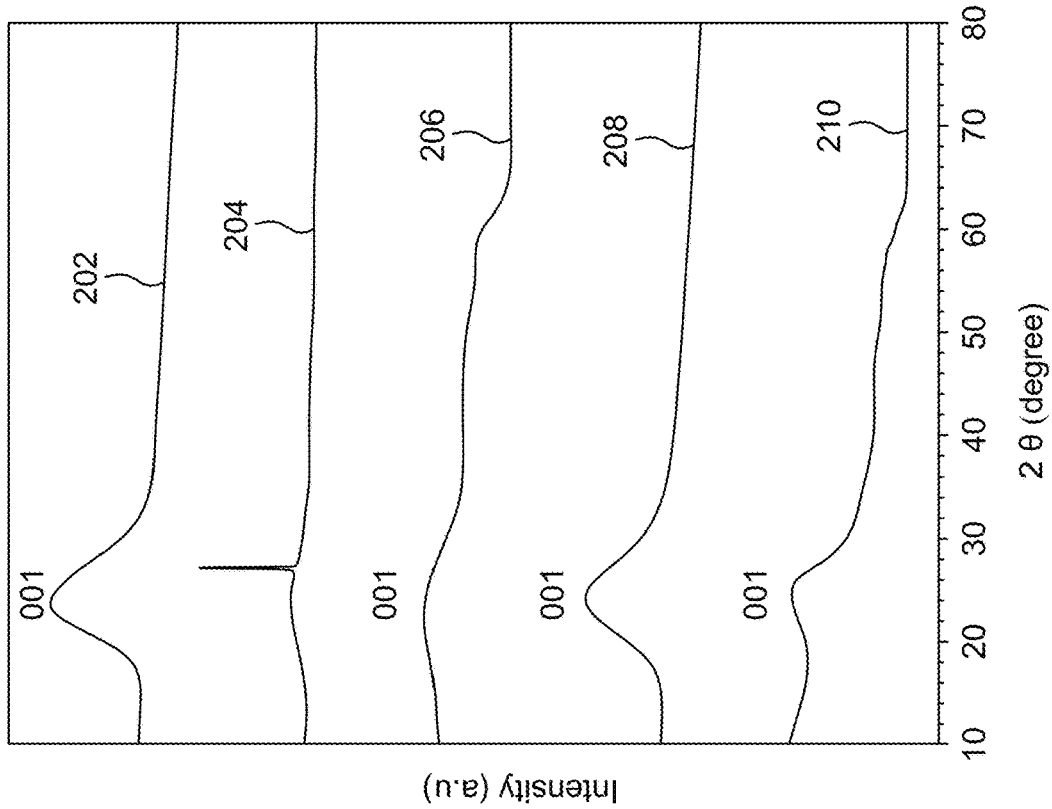
FIG. 2B
FIG. 2A

PEG

Sc-SiO$_2$

PEG/Sc-SiO$_2$ (e''')

DOPED PHASE CHANGE MATERIAL AND METHOD OF PREPARATION THEREOF

BACKGROUND

Technical Field

The present disclosure is directed to a doped phase change material (PCM), and particularly to a PEG/Sc—$SiO_2$-doped PCM and a PEG/Zn—$SiO_2$-doped PCM, and a method of preparing the doped PCMs.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Phase Change Materials (PCMs), also known as latent heat storage materials, have gained popularity in thermal energy storage field. Phase change materials (PCMs) are substances which release or absorb a large amount of energy during a phase transition, usually from solid to liquid and vice-versa, although it is also possible in principle to use solid-solid phase changes, for example, where the substance goes from conforming to one crystalline structure to conforming to another. PCMs store latent heat and utilize the heat of fusion during the phase transition. During phase changes, the temperature of the PCM remains nearly constant, despite addition of more heat. Conventionally, PCMs have drawbacks such as a high supercooling values, incapability of mitigating leakage problems to provide a sustainable performance, and low thermal conductivity, which lowers heat charging and discharging rates and decreases a thermal energy consumption efficiency. Hence, there is a need for efficient methods of preparing a PCM that may overcome the aforementioned limitations.

SUMMARY

In an exemplary embodiment, a method to form a doped phase change material (PCM) is described. The method includes mixing a dopant salt of at least one of cobalt, nickel, zinc, and scandium with a silicate, in a solvent, to form a first solution. The method includes mixing the first solution with a solvent mixture to form a second solution. The method further includes mixing the second solution with an acid to form an acid solution. The method further includes adding a catalyst and a polymer to the acid solution to form the doped PCM. The doped PCM includes the catalyst, the polymer, at least one of cobalt, nickel, zinc, and scandium, and $SiO_2$.

In some embodiments, the silicate is an orthosilicate. The solvent mixture includes ethanol, scandium (III) nitrate, and water. The acid is nitric acid. The polymer is polyethylene glycol (PEG).

In some embodiments, particles of the doped PCMs have a plate shape and have an average particle size of at least 100 nanometers (nm) in a longest dimension.

In some embodiments, particles of the doped PCM display a wave-like morphology and have an average particle size of at least 100 nm in a longest dimension.

In some embodiments, the doped PCM has a phase change enthalpy of from 100 joules per gram (J/g) to 200 J/g.

In some embodiments, the doped PCM has a latent heat of from 150 J/g to 170 J/g.

In some embodiments, the doped PCM has a thermal conductivity of from 0.5 watts per meter per kelvin (W/$m^{-1}K^{-1}$) to 0.7 W/$m^{-1}K^{-1}$.

In some embodiments, the dopant salt is a salt of scandium. A silicon to scandium ratio in the first solution ranges of from 2/1 to 10/1.

In some embodiments, a PEG/Zn—$SiO_2$ doped PCM was prepared by the method, wherein the PEG has an average molecular weight of from 4000 to 10000.

In some embodiments, the dopant salt for the PEG/Zn—$SiO_2$ doped PCM is a salt of Zn.

In some embodiments, the PEG/Zn—$SiO_2$ doped PCM has a phase change enthalpy of from 100 J/g to 150 J/g.

In some embodiments, the PEG/Zn—$SiO_2$ doped PCM has an impregnation efficiency of from 75% to 90%.

In some embodiments, the PEG/Zn—$SiO_2$ doped PCM has an extent of supercooling of from 10° C. to 30° C.

In some embodiments, the PEG/Zn—$SiO_2$ doped PCM has a thermal conductivity of from 0.50 W/$m^{-1}K^{-1}$ to 0.70 W/$m^{-1}K^{-1}$.

In some embodiments, a PEG/Sc—$SiO_2$ doped PCM was prepared by the method, wherein the PEG has an average molecular weight of from 4000 to 10000.

In some embodiments, the dopant salt for the PEG/Sc—$SiO_2$ doped PCM is a salt of Sc.

In some embodiments, the PEG/Sc—$SiO_2$ doped PCM has a phase change enthalpy of from 130 J/g to 160 J/g.

In some embodiments, the PEG/Sc—$SiO_2$ doped PCM has an impregnation efficiency of from 70% to 85%.

In some embodiments, the PEG/Sc—$SiO_2$ doped PCM has an extent of supercooling of from 10° C. to 30° C.

In some embodiments, the PEG/Sc—$SiO_2$ doped PCM has a thermal conductivity of from 0.40 W/$m^{-1}K^{-1}$ 0.60 W/$m^{-1}K^{-1}$.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2A is an X-ray diffraction (XRD) image of $SiO_2$, Co—$SiO_2$, Ni—$SiO_2$, Zn—$SiO_2$, and Sc—$SiO_2$ samples, according to certain embodiments;

FIG. 2B is the XRD image of PEG-$SiO_2$, PEG/Co—$SiO_2$, PEG/Ni—$SiO_2$, PEG/Zn—$SiO_2$, and PEG/Sc—$SiO_2$ PCMs samples, according to certain embodiments;

DETAILED DESCRIPTION

Figure 1:
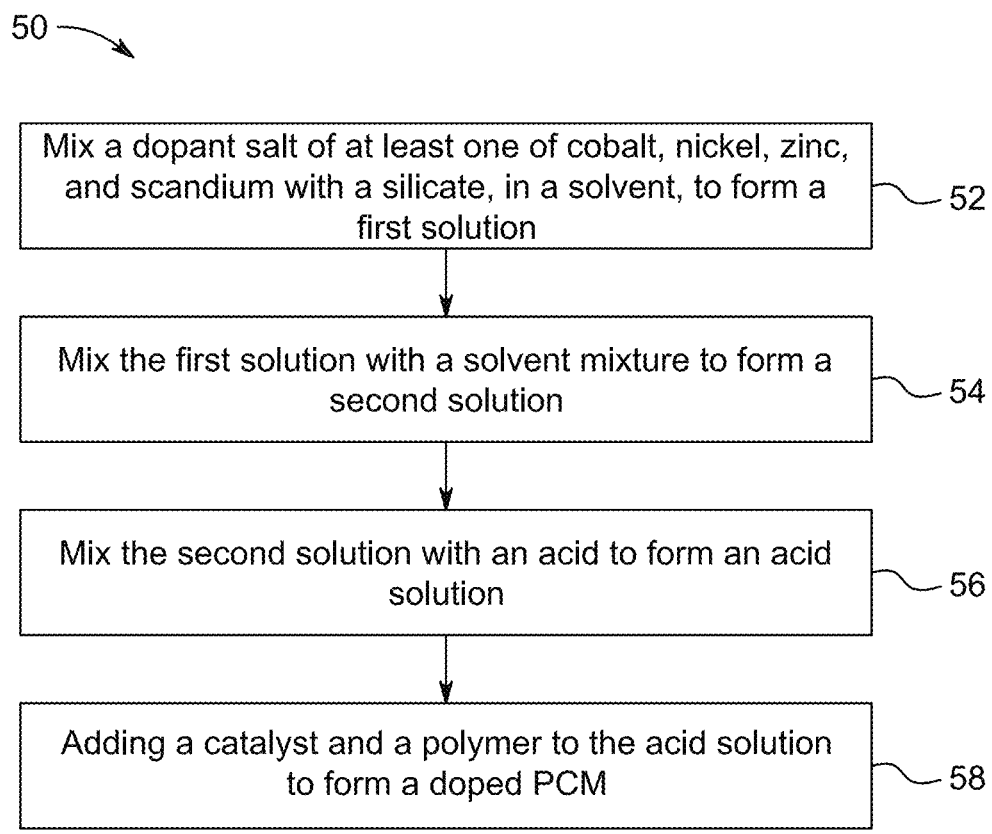
FIG. 1 is a schematic flow chart of a method of making a doped phase change material (PCM), according to certain embodiments.

In the drawings, like reference numerals designate identical or corresponding parts throughout the several views. Further, as used herein, the words "a," "an" and the like generally carry a meaning of "one or more," unless stated otherwise.

All processes used to prepare compounds of the present disclosure and intermediates made therein are considered to be part of the present disclosure. Both the free form and salts of products are within the scope of the disclosure. If so desired, one form of a compound may be converted into another form. Further, a given chemical formula or name shall encompass all conformers, rotamers, or conformational isomers thereof where such isomers exist. Different conformations can have different energies, can usually interconvert, and are very rarely isolatable.

The term "latent heat" as used herein, refers to the energy absorbed or released by a substance during a change in its physical state, wherein said change occurs without a corresponding change in its temperature. One or more substances having high latent heat may be used for energy storage which include acetic acid, acetone, alcohol (ethyl or methyl), aluminum, ammonia, aniline, benzene, bismuth, brass, carbon dioxide, carbon tetrachloride, cast iron, chromium, cobalt, copper, decane, dodecane, ethyl ether, ethylene glycol, glycerin, heptane, hexane, iron, manganese, naphthalene, nickel, octane, paraffin, phenol, platinum, silver, water, and zinc.

The term "PCM" or "Phase Change Material" as used herein, refers to those substances which can absorb or release a large amount of latent heat, as defined herein, when they go through a change in their physical state, i.e., from one physical state to other physical state and vice-versa. Non-limiting examples of PCMs include paraffin-based materials, acids, sugars, sulfates, chlorides, aluminum, copper, gold, iron, lead, lithium, silver, titanium, zinc, nitrates, hydroxides, fatty acids, alcohols, glycols and mixtures thereof.

The term "ss-PCM" or "Shape Stabilized PCM" as used herein, refers to PCMs, as defined herein, which use porous matrices as support. Non-limiting examples of porous support matrices include mesoporous carbon, mesoporous silica, graphene, carbon nanotubes, metal foams, and metal-organic frameworks.

In the drawings, like reference numerals designate identical or corresponding parts throughout the several views. As used herein, the words "a," "an" and the like generally carry a meaning of "one or more," unless stated otherwise. Further, the terms "approximately," "approximate," "about," and similar terms generally refer to ranges that include the identified value within a margin of 25%, 20%, 10%, or 5%, and any values therebetween. Furthermore, the terms "equal to," "substantially equal to," and similar terms generally refer to ranges that include the identified value within a margin of 75%, 80%, 85%, 90%, 95%, or 100%, and any values therebetween.

As used herein, the terms "optional" or "optionally" means that the subsequently described event(s) can or cannot occur or the subsequently described component(s) may or may not be present (e.g., 0 wt. %).

Furthermore, the terms "approximately," "approximate," "about," and similar terms generally refer to ranges that include the identified value within a margin of 20%, 10%, or preferably 5%, and any values therebetween.

Aspects of the present disclosure are directed towards a doped phase change material (PCM) and a method of preparation thereof. Although the description herein refers to the PCM including a dopant salt of at least one of cobalt, nickel, zinc, it may be understood by a person skilled in the art that the PCM may also include the dopant salt of aluminum, magnesium, diamond, silicon, germanium, silicon carbide, silicon germanium, boron, arsenic, phosphorus, or gallium. Experimental results with the PCM of the present disclosure demonstrated a significant increase in thermal and hydrothermal stabilities. In addition, the PCM was shown to exhibit high energy storage capacity and thermal energy storage or release rates, at low costs, thereby circumventing the drawbacks such as low thermal conductivity and high supercooling properties of the prior art.

FIG. 1 is a schematic flow diagram of a method 50 of making a doped PCM. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing a dopant salt of at least one of cobalt, nickel, zinc, and scandium with a silicate, in a solvent, to form a first solution. In some embodiments, the dopant salt may be of lithium, sodium, potassium, calcium, magnesium, strontium, barium, titanium, vanadium, chromium, manganese, iron, copper, aluminum and combinations thereof. In some embodiments, the dopant salt may include, but is not limited to, oxides, sulphates, nitrates, chlorides of at least one of cobalt, nickel, zinc, and scandium. In some embodiments, the dopant salt may include, but is not limited to, oxides, sulphates, nitrates, chlorides of lithium, sodium, potassium, calcium, magnesium, strontium, barium, titanium, vanadium, chromium, manganese, iron, copper, aluminum and combinations thereof. In some embodiments, the mixing occurs at speeds of 10 rotations per minute (rpm) to 200 rpm, preferably 20 rpm to 180 rpm, preferably 40 rpm to 160 rpm, preferably 60 rpm to 140 rpm, preferably 80 rpm to 120 rpm, or 100 rpm.

In some embodiments, the dopant salt is a salt of scandium. In some embodiments, the dopant salt is scandium nitrate hexahydrate (Sc(NO$_3$)$_2$·6H$_2$O). In some embodiments, the dopant salt is a salt of zinc. In some embodiments, the dopant salt is zinc nitrate hexahydrate (Zn(NO$_3$)$_2$·6H$_2$O). In some embodiments, a silicon to scandium ratio in the first solution ranges of from 2/1 to 10/1, preferably 2.5/1 to 9.5/1, preferably 3/1 to 9/1, preferably 3.5/1 to 8.5/1, preferably 4/1 to 8/1, preferably 4.5/1 to 7.5/1, preferably 5/1 to 7/1, preferably 5.5/1 to 6.5/1, or 6/1. In some embodiments, the silicate may include, but is not limited to, orthosilicate, sorosilicates, cyclosilicates, inosilicates, phyllosilicates, pyrosillicates, and tectosilicates. In some embodiments, the silicate is an orthosilicate. In some embodiments, the silicate is tetraethyl orthosilicate (TEOS). In some embodiments, the solvent may include any protic solvent, such as methanol, ethanol, isopropyl alcohol, acetic acid, dichloromethane, tetrahydrafuran, ethyl acetate, acetonitrile, dimethylformamide, dimethyl sulfoxide, acetone, hexamethylphosphoric triamide, or the like. In some embodiments, the solvent is water.

At step 54, the method 50 includes mixing the first solution with a solvent mixture to form a second solution. In some embodiments, the solvent mixture includes ethanol, scandium (III) nitrate, and water. In alternate embodiments, the ethanol can be replaced with butanol, propanol, methanol, acetone, or the like. In alternate embodiments, the scandium (III) nitrate can be replaced with titanium (IV) nitrate, vanadium nitrate, yttrium (III) nitrate, zirconium (IV) nitrate, chromium (III) nitrate, or the like. In alternate embodiments, the water can be replaced with any protic solvent, such as methanol, ethanol, isopropyl alcohol, acetic acid, dichloromethane, tetrahydrafuran, ethyl acetate, acetonitrile, dimethylformamide, dimethyl sulfoxide, acetone, hexamethylphosphoric triamide, or the like. In some embodiments, the mixing occurs at speeds of 10 rotations per minute (rpm) to 200 rpm, preferably 20 rpm to 180 rpm, preferably 40 rpm to 160 rpm, preferably 60 rpm to 140 rpm, preferably 80 rpm to 120 rpm, or 100 rpm.

At step 56, the method 50 includes mixing the second solution with an acid to form an acid solution. In some embodiments, pH of the second solution may be adjusted to 1 to 1.5 by adding sufficient acid to form the acid solution at the desired pH. In some embodiments, pH of the second solution may be adjusted to from 1.2 to 1.4 or about 1.3 by adding the acid to form the acid solution. In some embodiments, the acid may include, but is not limited to, hydrochloric acid, sulfuric acid, sulfurous acid, pyrosulfuric acid, phosphoric acid, nitric acid, formic acid, acetic acid, phenylsulfonic acid, thionamic acid, p-methyl benzenesulfonic acid. In some embodiments, the acid is nitric acid and/or hydrochloric acid. In some embodiments, the acid is mixed with the second solution in a drop-wise fashion. In some embodiments, the acid is added in a timeframe ranging from 1 minute to 60 minutes, preferably 10 minutes to 50 minutes, preferably 20 minutes to 40 minutes, or 30 minutes. In some embodiments, the mixing occurs at speeds of 10 rotations per minute (rpm) to 200 rpm, preferably 20 rpm to 180 rpm, preferably 40 rpm to 160 rpm, preferably 60 rpm to 140 rpm, preferably 80 rpm to 120 rpm, or 100 rpm.

At step 58, the method 50 further includes adding a catalyst and a polymer to the acid solution to form the doped PCM. The doped PCM includes the catalyst, the polymer, at least one of cobalt, nickel, zinc, and scandium, and $SiO_2$.

In some embodiments, the catalyst is a nickel, platinum, palladium, copper, or other metal-based catalyst. In some embodiments, the catalyst is added in an amount ranging from 25 mg to 100 mg per unit volume of the doped PCM, preferably 30 mg to 90 mg, preferably 40 mg to 80 mg, preferably 50 mg to 70 mg, or 60 mg. In some embodiments, the polymer is polyethylene glycol (PEG). In some embodiments, the polymer is methoxy polyethylene glycol (mPEG). In some embodiments, the PEG has an average molecular weight of from 4000 to 10000, preferably 5000 to 9000, preferably 6000 to 8000, or 7000. In some embodiments, the PEG may be selected from a group of PEG homopolymers within a defined weight average molecular weight range such as for example PEG-200, PEG-400, PEG-600, PEG-800, PEG-1000, PEG-2000, PEG-4000, PEG-6000, PEG-8000, PEG-10000, and the like. In some embodiments, the polymer is a homopolymer comprising repeat units of polyethylene. In some embodiments, the polymer is a heteropolymer or copolymer, and can be combined with other polymers such as such as polyvinyl alcohol, poly (lactic-co-glycolic acid), poly(lactic-co-glycol), polylactic acid, polycaprolactone, polyglycolic acid, polybutylene terephthalate, or polyethylene terephthalate. In some embodiments, the polymer may be methylated which can be further functionalized for block copolymer synthesis or bioconjugation with PEG itself. In some embodiments, encapsulation of the PEG within the pores of the silica gel of the doped PCM occurs. In some embodiments, the doped PCM has a mass fraction of silica ranging from 20 wt % to 80 wt % of the doped PCM, preferably 30 wt % to 70 wt %, preferably 40 wt % to 60 wt %, or 50 wt %. In some embodiments, the addition of the polymer in step 58 allows for the creation of PEG crystals within the silica gel pores in the doped PCM. In some embodiments, the PEG crystals are cubic, hexagonal, monoclinic, orthorhombic, tetragonal, triclinic, or trigonal in their structure, or molecular in structure and having a less defined shape.

In some embodiments, step 58 further includes heating the doped PCM with water vapor to convert the doped PCM into pellets. In some embodiments, the formed PCM is placed between glass wool plugs in a reactor. In some embodiments, a mass flow controller was used to control a gas flow rate and a furnace temperature was increased at a linear heating rate. In some embodiments, the gas flow rate is between 10 $m^3$/minute to 250 $m^3$/min, preferably 25 $m^3$/minute to 225 $m^3$/min, preferably 50 $m^3$/minute to 200 $m^3$/min, preferably 75 $m^3$/minute to 175 $m^3$/min, preferably 100 $m^3$/minute to 150 $m^3$/min, or 125 $m^3$/min. In some embodiments, the furnace temperature was increased at a rate between 1° C./min to 20° C./min, preferably 2° C./min to 18° C./min, preferably 4° C./min to 16° C./min, preferably 6° C./min to 14° C./min, preferably 8° C./min to 22° C./min, or 10° C./min to form pellets. The PCM was converted into pellets, crushed, and sieved into grains ranging from 1 mm to 5 mm in length, preferably 2 mm to 4 mm, or 3 mm in the presence of water vapor with a feed including air and 10% water vapor to 20% water vapor in helium, preferably 11% to 19%, preferably 12% to 18%, preferably 13% to 17%, preferably 14% to 16%, or 15% water vapor. In other embodiments, the water vapor was present with nitrogen, neon, argon, or other inert gases.

In some embodiments, step 58 further includes molded the doped PCM with a mold to form the doped PCM into a desired shape. In some embodiments, the doped PCM is molded into a circular, triangular, rectangular, square, pentagonal, hexagonal, or other polygonal shape. To ensure the doped PCM obtains the desired shape, the doped PCM is cured within the mold at a temperature ranging from 50° C. to 400° C., preferably 100° C. to 350° C., preferably 150° C. to 300° C., preferably 200° C. to 250° C., or 225° C. In some embodiments, the curing takes place with UV lamps, tank heaters, resistive heating wires, resistive heating coils, or other heat-curing means.

In some embodiments, step 58 forms a doped PCM with an amorphous $SiO_2$ having a soft clay type morphology. The amorphous nature of the doped PCM can be described as no clearly defined shape or form. The soft clay type morphology can be described as being inelastic, meaning when it changes shape due to force, it remains in the changed shape when the forces are removed. The soft clay refers to the smooth topology of the PCM surface, with minimal edges, divets, cracks, or other jagged features that impart texture.

In some embodiments, step 58 further uses a porous matrix as a support to form a shape-stabilized PCM (ss- PCM). The term "ss-PCM" or "Shape Stabilized PCM" as used herein, refers to PCMs, as defined herein, which use porous matrices as support, such as mesoporous carbon, mesoporous silica, graphene, carbon nanotubes, metal foams, and metal-organic frameworks.

In some embodiments, the doped PCM includes a catalyst containing one or more of lithium, sodium, potassium, calcium, magnesium, strontium, barium, titanium, vanadium, chromium, manganese, iron, copper, and aluminum. The doped PCM has an amount of aluminum ranging from 1 weight (wt %) to 5 wt % of the doped PCM, preferably 2 wt % to 4 wt %, or 3 wt % of the doped PCM. The doped PCM has an amount of silicon ranging from 60 weight (wt %) to 95 wt % of the doped PCM, preferably 67.5 wt % to 87.5 wt %, preferably 70 wt % to 85 wt %, preferably 72.5 wt % to 82.5 wt %, preferably 75 wt % to 80 wt %, or 77.5 wt % of the doped PCM. The doped PCM has an amount of sulfur ranging from 3 weight (wt %) to 21 wt % of the doped PCM, preferably 5 wt % to 19 wt %, preferably 7 wt % to 17 wt %, preferably 9 wt % to 15 wt %, preferably 11 wt % to 13 wt %, or 12 wt % of the doped PCM. The doped PCM has an amount of calcium ranging from 1 weight (wt %) to 6 wt % of the doped PCM, preferably 1.75 wt % to 5.25 wt %, preferably 2.5 wt % to 4.5 wt %, preferably 3.25 wt % to 3.75 wt %, or 3.5 wt % of the doped PCM. The doped PCM has an amount of titanium ranging from 0.2 weight (wt %) to 2 wt % of the doped PCM, preferably 0.4 wt % to 1.8 wt %, preferably 0.6 wt % to 1.6 wt %, preferably 0.8 wt % to 1.4 wt %, or 1 wt % of the doped PCM. The doped PCM has an amount of vanadium ranging from 0.05 weight (wt %) to 3 wt % of the doped PCM, preferably 0.25 wt % to 2.75 wt %, preferably 0.5 wt % to 2.5 wt %, preferably 0.75 wt % to 2.25 wt %, preferably 1 wt % to 2 wt %, or 1.5 wt % of the doped PCM. The doped PCM has an amount of chromium ranging from 0.1 weight (wt %) to 1 wt % of the doped PCM, preferably 0.2 wt % to 0.9 wt %, preferably 0.3 wt % to 0.8 wt %, preferably 0.4 wt % to 0.7 wt %, preferably 0.5 wt % to 0.6 wt %, or 0.55 wt % of the doped PCM. The doped PCM has an amount of iron ranging from 0.3 weight (wt %) to 1.5 wt % of the doped PCM, preferably 0.4 wt % to 1.4 wt %, preferably 0.5 wt % to 1.3 wt %, preferably 0.6 wt % to 1.2 wt %, preferably 0.7 wt % to 1.1 wt %, preferably 0.8 wt % to 1 wt %, or 0.9 wt % of the doped PCM. The doped PCM has an amount of nickel ranging from 0.1 weight (wt %) to 0.3 wt % of the doped PCM, preferably 0.12 wt % to 0.28 wt %, preferably 0.14 wt % to 0.26 wt %, preferably 0.16 wt % to 0.24 wt %, preferably 0.18 wt % to 0.22 wt %, or 0.2 wt % of the doped PCM. The doped PCM has an amount of scandium ranging from 1 weight (wt %) to 10 wt % of the doped PCM, preferably 2 wt % to 9 wt %, preferably 3 wt % to 8 wt %, preferably 4 wt % to 7 wt %, preferably 5 wt % to 6 wt %, or 5.5 wt % of the doped PCM. The doped PCM has an amount of zinc ranging from 0.1 weight (wt %) to 4 wt % of the doped PCM, preferably 0.5 wt % to 3.5 wt %, preferably 1 wt % to 3 wt %, preferably 1.5 wt % to 2.5 wt %, or 2 wt % of the doped PCM. The doped PCM has an amount of yttrium ranging from 0.1 weight (wt %) to 1 wt % of the doped PCM, preferably 0.2 wt % to 0.9 wt %, preferably 0.3 wt % to 0.8 wt %, preferably 0.4 wt % to 0.7 wt %, preferably 0.5 wt % to 0.6 wt %, or 0.55 wt % of the doped PCM. The doped PCM has an amount of potassium ranging from 0.1 weight (wt %) to 2 wt % of the doped PCM, preferably 0.2 wt % to 1.8 wt %, preferably 0.4 wt % to 1.6 wt %, preferably 0.6 wt % to 1.4 wt %, preferably 0.8 wt % to 1.2 wt %, or 1 wt % of the doped PCM.

In some embodiments, particles of the doped PCMs may have a circular shape, a cubical shape, a cuboidal shape, or a plate shape. As depicted in FIG. 4D, the particles of the doped PCM preferably have a circular shape, with the particles having no sharp corners or edges. As depicted in FIG. 4C, the particles of the doped PCM have a cubical shape, with the particles having six approximately equal, square-shaped faces. Also depicted in FIG. 4C, some of the particles display a cuboidal shape, similar to the cubical shape, as the particles are not perfectly cubical and do not form 6 perfectly equal, square-shaped faces. As depicted in FIG. 4E, some of the particles display a plate shape, with the particles having a broad, flat rectangular appearance across the length of the particle. In some embodiments, particles of the doped PCMs have a plate shape. In some embodiments, particles of the doped PCMs have an average particle size of at least 100 nanometers (nm) in a longest dimension, preferably at least 120 nm, preferably at least 140 nm, preferably at least 160 nm, preferably at least 180 nm, or at least 200 nm. In some embodiments, particles of the doped PCM display a wave-like morphology and have an average particle size of at least 100 nm in a longest dimension, preferably at least 120 nm, preferably at least 140 nm, preferably at least 160 nm, preferably at least 180 nm, or 200 nm. As depicted in FIG. 4E, the particles of the doped PCM have a wave-like shape, with the particles displaying a sinusoidal pattern and/or undulating pattern in which pairs of opposing and/or perpendicular apexes are not coplanar. The sinusoidal pattern can be explained as the curve traced out by a point on a circle as the circle is rolled along a line. In some embodiments, the doped PCM has a phase change enthalpy of from 100 joules per gram (J/g) to 200 J/g, preferably 110 J/g to 190 J/g, preferably 120 J/g to 180 J/g, preferably 130 J/g to 170 J/g, preferably 140 J/g to 160 J/g, or 150 J/g. In some embodiments, the phase change enthalpy of the doped PCM may be from 145 to 165 J/g, preferably 147.5 J/g to 162.5 J/g, preferably 150 J/g to 160 J/g, preferably 152.5 J/g to 157.5 J/g, preferably 155 J/g. As used herein, the term 'phase change enthalpy' refers to the amount of energy required to change a phase of a material.

In some embodiments, the doped PCM has a latent heat of from 150 J/g to 170 J/g, preferably 152 J/g to 168 J/g, preferably 154 J/g to 166 J/g, preferably 156 J/g to 164 J/g, preferably 158 J/g to 162 J/g, or 160 J/g. In some embodiments, the latent heat of the doped PCM may lie in a range of about 155 J/g to 165 J/g, preferably 156 J/g to 164 J/g, preferably 157 J/g to 163 J/g, preferably 158 J/g to 162 J/g, preferably 159 J/g to 161 J/g, or 160 J/g. In some embodiments, the doped PCM has a thermal conductivity of from 0.5 watts per meter per kelvin (W/m$^{-1}$K$^{-1}$) to 0.7 W/m$^{-1}$K$^{-1}$, preferably 0.52 W/m$^{-1}$K$^{-1}$ to 0.68 W/m$^{-1}$K$^{-1}$, preferably 0.54 W/m$^{-1}$K$^{-1}$ to 0.66 W/m$^{-1}$K$^{-1}$, preferably 0.56 W/m$^{-1}$K$^{-1}$ to 0.64 W/m$^{-1}$K$^{-1}$, preferably 0.58 W/m$^{-1}$K$^{-1}$ to 0.62 W/m$^{-1}$K$^{-1}$, or 0.6 W/m$^{-1}$K$^{-1}$. In some embodiments, the thermal conductivity of the doped PCM may lie in a range of about 0.6 W/m$^{-1}$K$^{-1}$ to about 0.65 W/m$^{-1}$K$^{-1}$, preferably 0.605 W/m$^{-1}$K$^{-1}$ to 0.645 W/m$^{-1}$K$^{-1}$, preferably 0.61 W/m$^{-1}$K$^{-1}$ to 0.64 W/m$^{-1}$K$^{-1}$, preferably 0.615 W/m$^{-1}$K$^{-1}$ to 0.635 W/m$^{-1}$K$^{-1}$, preferably 0.62 W/m$^{-1}$K$^{-1}$ to 0.63 W/m$^{-1}$K$^{-1}$, or 0.625 W/m$^{-1}$K$^{-1}$. As used herein, the term 'thermal conductivity' refers to the ability of a given material to conduct or transfer heat. In some embodiments, ZnO is contained inside the thermally conductive SiO$_2$ network of the doped PCM. The high conductability of the ZnO may enhance the intermolecular forces, thereby improving thermal conductivity within the doped PCM.

In some embodiments, a PEG/Zn—SiO$_2$ doped PCM is prepared by the method 50 and contains a dopant salt which is a salt of Zn. In alternate embodiments, the dopant salt includes one or more salts of aluminum, magnesium, diamond, silicon, germanium, silicon carbide, silicon germanium, boron, arsenic, phosphorus, or gallium.

In some embodiments, the PEG/Zn—SiO$_2$ doped PCM has a phase change enthalpy of from 100 J/g to 150 J/g, preferably 152 J/g to 168 J/g, preferably 154 J/g to 166 J/g, preferably 156 J/g to 164 J/g, preferably 158 J/g to 162 J/g, or 160 J/g. In some embodiments, the phase change enthalpy of the PEG/Zn—SiO$_2$ doped PCM may lie in a range of about 145 J/g to 165 J/g, preferably 147.5 J/g to 162.5 J/g, preferably 150 J/g to 160 J/g, preferably 152.5 J/g to 157.5 J/g, or 155 J/g. In some embodiments, the PEG/Zn—SiO$_2$ doped PCM has an impregnation efficiency of from 75% to 90%, preferably 77.5% to 87.5%, preferably 80% to 85%, or 82.5%. In some embodiments, the impregnation efficiency of the PEG/Zn—SiO$_2$ doped PCM may lie in a range of about 75% to about 80%, preferably 75.5% to 79.5%, preferably 76% to 79%, preferably 76.5% to 78.5%, preferably 77% to 78%, or 77.5%. As used herein, the impregnation efficiency may refer to an efficiency of mixing or penetration of the PEG within the silica gel of the doped PCM. The percentage can be calculated by dividing the volume of the PEG crystals from the total volume of the doped PCM. In some embodiments, the PEG/Zn—SiO$_2$ doped PCM has an extent of supercooling of from 10° C. to 30° C., preferably 12° C. to 28° C., preferably 14° C. to 26° C., preferably 16° C. to 24° C., preferably 18° C. to 22° C., or 20° C. In some embodiments, the extent of supercooling of the PEG/Zn—SiO$_2$ doped PCM may lie in a range of about 22.5° C. to about 24.5° C., preferably 22.7° C. to 24.3° C., preferably 22.9° C. to 24.1° C., preferably 23.1° C. to 23.9° C., preferably 23.3° C. to 23.7° C., or 23.5° C. As used herein, the extent of supercooling may refer to the difference between the freezing and melting temperatures of a given sample or material. In some embodiments, the PEG/Zn—SiO$_2$ doped PCM has a thermal conductivity of from 0.50 W/m$^{-1}$K$^{-1}$ to 0.70 W/m$^{-1}$K$^{-1}$, preferably 0.52 W/m$^{-1}$K$^{-1}$ to 0.68 W/m$^{-1}$K$^{-1}$, preferably 0.54 W/m$^{-1}$K$^{-1}$ to 0.66 W/m$^{-1}$K$^{-1}$, preferably 0.56 W/m$^{-1}$K$^{-1}$ to 0.64 W/m$^{-1}$K$^{-1}$, preferably 0.58 W/m$^{-1}$K$^{-1}$ to 0.62 W/m$^{-1}$K$^{-1}$, or 0.6 W/m$^{-1}$K$^{-1}$. In some embodiments, the thermal conductivity of the PEG/Zn—SiO$_2$ doped PCM may lie in a range of about 0.67 W/m$^{-1}$K$^{-1}$ to 0.69 W/m$^{-1}$K$^{-1}$, preferably 0.672 W/m$^{-1}$K$^{-1}$ to 0.688 W/m$^{-1}$K$^{-1}$, preferably 0.674 W/m$^{-1}$K$^{-1}$ to 0.686 W/m$^{-1}$K$^{-1}$, preferably 0.676 W/m$^{-1}$K$^{-1}$ to 0.684 W/m$^{-1}$K$^{-1}$, preferably 0.678 W/m$^{-1}$K$^{-1}$ to 0.682 W/m$^{-1}$K$^{-1}$, or 0.68 W/m$^{-1}$K$^{-1}$.

In some embodiments, a PEG/Sc—SiO$_2$ doped PCM was prepared by the method 50. The dopant salt for the PEG/Sc—SiO$_2$ doped PCM is a salt of Sc. In alternate embodiments, the dopant salt includes one or more salts of aluminum, magnesium, diamond, silicon, germanium, silicon carbide, silicon germanium, boron, arsenic, phosphorus, or gallium.

In some embodiments, the PEG/Sc—SiO$_2$ doped PCM has a phase change enthalpy of from 130 J/g to 160 J/g, preferably 132.5 J/g to 157.5 J/g, preferably 135 J/g to 155 J/g, preferably 137.5 J/g to 152.5 J/g, preferably 140 J/g to 150 J/g, preferably 142.5 J/g to 147.5 J/g, or 145 J/g. In some embodiments, the phase change enthalpy of the PEG/Sc—SiO$_2$ doped PCM may lie in a range of about 152 J/g to about 158 J/g, preferably 152.5 J/g to 157.5 J/g, preferably 153 J/g to 157 J/g, preferably 154.5 J/g to 156.5 J/g, preferably 155 J/g to 156 J/g, or 155.5 J/g. In some embodiments, the PEG/Sc—SiO$_2$ doped PCM has an impregnation efficiency of from 70% to 85%, preferably 72.5% to 82.5%, preferably 75% to 80%, or 77.5%.

In some embodiments, the impregnation efficiency of the PEG/Sc—SiO$_2$ doped PCM may lie in a range of about 82% to about 84%, preferably 82.2% to 83.8%, preferably 82.4% to 83.6%, preferably 82.6% to 83.4%, preferably 82.8% to 83.2%, or 83%.

In some embodiments, the PEG/Sc—SiO$_2$ doped PCM has an extent of supercooling of from 10° C. to 30° C., preferably 12° C. to 28° C., preferably 14° C. to 26° C., preferably 16° C. to 24° C., preferably 18° C. to 22° C., or 20° C. In some embodiments, the extent of supercooling of the PEG/Sc—SiO$_2$ doped PCM may lie in a range of about 16° C. to 18° C., preferably 16.2° C. to 17.8° C., preferably 16.4° C. to 17.6° C., preferably 16.6° C. to 17.4° C., preferably 16.8° C. to 17.2° C., or 17° C.

In some embodiments, the PEG/Sc—SiO$_2$ doped PCM has a thermal conductivity of from 0.40 W/m$^{-1}$K$^{-1}$ to 0.60 W/m$^{-1}$K$^{-1}$, preferably 0.42 W/m$^{-1}$K$^{-1}$ to 0.58 W/m$^{-1}$K$^{-1}$, preferably 0.44 W/m$^{-1}$K$^{-1}$ to 0.56 W/m$^{-1}$K$^{-1}$, preferably 0.46 W/m$^{-1}$K$^{-1}$ to 0.54 W/m$^{-1}$K$^{-1}$, preferably 0.48 W/m$^{-1}$K$^{-1}$ to 0.52 W/m$^{-1}$K$^{-1}$, or 0.5 W/m$^{-1}$K$^{-1}$. In some embodiments, the thermal conductivity of the PEG/Sc—SiO$_2$ doped PCM may lie in a range of about 0.57 W/m$^{-1}$K$^{-1}$ to about 0.59 W/m$^{-1}$K$^{-1}$, preferably 0.572 W/m$^{-1}$K$^{-1}$ to 0.588 W/m$^{-1}$K$^{-1}$, preferably 0.574 W/m$^{-1}$K$^{-1}$ to 0.586 W/m$^{-1}$K$^{-1}$, preferably 0.576 W/m$^{-1}$K$^{-1}$ to 0.584 W/m$^{-1}$K$^{-1}$, preferably 0.578 W/m$^{-1}$K$^{-1}$ to 0.582 W/m$^{-1}$K$^{-1}$, or 0.58 W/m$^{-1}$K$^{-1}$.

In some embodiments, the doped PCMs have a freezing temperature range from 28.5° C. to 40° C., preferably 30° C. to 38° C., preferably 32° C. to 36° C., or 34° C. In some embodiments, the doped PCMs have a melting temperature range from 50° C. to 60° C., preferably 52° C. to 58° C., preferably 54° C. to 56° C., or 55° C. In some embodiments, the doped PCMs have a melting temperature range from 50° C. to 60° C., preferably 52° C. to 58° C., preferably 54° C. to 56° C., or 55° C. In some embodiments, the doped PCMs have a difference in melting temperature from freezing temperature ranging from 20° C. to 25° C., preferably 21° C. to 24° C., preferably 22° C. to 23° C., or 22.5° C. The large difference between the freezing and melting temperature can be attributed to weaker peaks of melting and solidification of the composites as shown in FIGS. 10A-10E.

EXAMPLES

The following examples describe and demonstrate exemplary embodiments of the method 50 of making the doped PCM described herein. The examples are provided solely for the purpose of illustration and are not to be construed as limitations of the present disclosure, as many variations thereof are possible without departing from the spirit and scope of the present disclosure.

Materials Required

PEG (average molecular weight of 6000) was used as a PCM. Ethyl alcohol, carbon nanotubes, Zn(NO$_3$)$_2$·6H$_2$O, Sc(NO$_3$)$_2$·6H$_2$O, ethanol, nitric acid (HNO$_3$), and TEOS were used. All chemicals were used without further purification.

Preparation of PCMs

SiO$_2$ and Sc-doped SiO$_2$ powder samples with varying Sc content (Si/Sc=4/1, 3/1, and 2/1) were synthesized using a sol-gel technique. The following procedure was used to prepare Sc-doped $SiO_2$ sol with a Si/Sc ratio of 3/1. 8.34 g of the TEOS was added to a solution containing a 50 g ethanol/11.49 g $Sc(NO_3)_2 \cdot 6H_2O$ mixture, which was hydrolyzed and condensed for 12 hours. Then water was added to increase the total weight of the mixture to 500 g. The pH of the solution was adjusted to 1.2 by adding 2.0 g of $HNO_3$, and the mixture was condensed for 12 hours. Several factors, such as changing an amount of a catalyst and water and aging time of the solution at room temperature (RT) can be used to control the degree of hydrolysis and condensation. A molar ratio of components is 1:5:6.8:0.123:0.25 of TEOS:$C_2H_5OH$:$H_2O$:$HNO_3$.

Hydrothermal Treatment of PCMs

A Pyrex glass tubular reactor with an internal diameter of 12 millimeters (mm) was used for a treatment of the PCMs with water vapor. The PCMs were placed between glass wool plugs in the Pyrex glass tubular reactor. A mass flow controller was used to control a gas flow rate and a furnace temperature was increased at a linear heating rate. The PCM was converted into pellets, crushed, and sieved into 1-2 mm grains prior to conducting stability tests in a presence of water vapor with a feed including air and 10% water vapor in Helium.

Characterization

Light-to-Heat Energy Conversion Experiment

The PCMs (diameter 5 centimeters (cm); mass 5.0 g) were placed in a heat insulated foam container for irradiation. A solar power meter was used to measure an intensity of the radiation generated by a solar simulator (PlS-SXE300, Beijing Chang Tuo, China, TES-1333R, thermal energy storage (TES) Electronic Corp, Taipei, Taiwan). A device including a Pt thermocouple, a thermocouple-to-analogue connector (RS-232-RS-485, Instrument Co., Ltd. Jiangsu Suke, China), and a data logger (SK130RD106062560021A1, Instrument Co., Ltd. Jiangsu Suke, China) were used to capture a temperature-time curve. A PEG/Sc—$SiO_2$ sample was subjected to cycled light irradiation experiments. In the irradiation experiments, an area of 19.6 $cm^2$ of 5.0 g of a PCM sample, placed in a weighing vial (R=2.5 cm), was irradiated using simulated radiation with a power of 1000 watts per square meter ($W/m^2$). After one hour of irradiation, the light was turned off, and the sample was allowed to cool to ambient temperature. Cycling experiments were conducted for 200 cycles. A temperature gradient or a thermocline separated hot and cold temperature zones.

The XRD patterns of the Zn—$SiO_2$ and Sc—$SiO_2$ were similar to that of the $SiO_2$ which showed that the structure of the $SiO_2$ was not affected by the incorporation of Zn and Sc. Chemical composition of the $SiO_2$, PEG/Zn—$SiO_2$, and PEG/Sc—$SiO_2$ were also determined using X-ray fluorescence (XRF), and the results are shown in Tables 1A and 1B.

TABLE 1A

Chemical composition (wt. %) of $SiO_2$, Zn—$SiO_2$ and Sc—$SiO_2$ determined by XRF

| Components | O | Al | Si | S | Ca | Ti | V |
|---|---|---|---|---|---|---|---|
| $SiO_2$ wt. % | 0 | 2.83 | 90.48 | 3.6 | 1.8 | 0.35 | 0.08 |
| Zn—$SiO_2$ wt.% | 0 | 0 | 62.42 | 20.53 | 5.91 | 1.39 | 2.78 |
| Sc—$SiO_2$ wt. % | 0 | 0 | 88.58 | 0 | 1.14 | 0 | 0.52 |

TABLE 1B

Chemical composition (wt. %) of $SiO_2$, Zn—$SiO_2$ and Sc—$SiO_2$ determined by XRF

| Components | Cr | Fe | Ni | Sc | Zn | Y | K |
|---|---|---|---|---|---|---|---|
| $SiO_2$ wt. % | 0.2 | 0.5 | 0.16 | 0 | 0 | 0 | 0 |
| Zn—$SiO_2$ wt.% | 0 | 1.1 | 0 | 0 | 3.35 | 0.91 | 1.61 |
| Sc—$SiO_2$ wt. % | 0 | 0.34 | 0 | 9.42 | 0 | 0 | 0.00 |

Tables 1A and 1B show that the chemical composition of the $SiO_2$ was determined for comparison purposes. The PEG/Zn—$SiO_2$ and PEG/Sc—$SiO_2$ samples mainly include Al, S, Ca, Ti, V, Cr, Fe, Ni, Y, and K with minor quantities of other oxides, without any radioactive elements. Thus, the PCMs including the PEG/Sc—$SiO_2$ may not harm human health. Hence, the PCMs including PEG/Sc—$SiO_2$ can be used for applications involving thermal energy storage (TES) in a building envelope. In the case of the Sc—$SiO_2$ sample, other metal oxides, for example, the metal oxides of S, Ti, V, Cr, Fe, Ni, Y and K, were not detected, which can be attributed to a metal displacement reaction or etching capability of Sc. As a result, contamination is significantly lower compared to that of the Zn—$SiO_2$.

Characterization of PCM Composites and Chemical Compatibility Analysis

The XRD patterns of $SiO_2$ (202) and Co-doped $SiO_2$ powder sample (204), Ni-doped $SiO_2$ powder sample (206), Zn-doped $SiO_2$ powder sample (208), and Sc-doped $SiO_2$ powder sample (210) calcined at 120° C. in air for 24 hours are shown in FIG. 2A. Hereinafter, the Co—, Ni—, Zn—, and Sc-doped $SiO_2$ powder samples are collectively referred to as the 'samples/composites' or individually referred to as the 'sample/composite', unless otherwise specified. The XRD patterns of the samples were similar to the XRD pattern of the $SiO_2$, indicating the amorphous nature of the samples. The XRD patterns of all the samples have a broad band at a Bragg angle of 20=22° as shown in FIG. 2A, indicating that all the samples mostly include the amorphous $SiO_2$ with a soft clay type morphology.

A broadened XRD pattern was observed for the Ni-doped $SiO_2$ powder sample (206). All the samples excluding Co-doped $SiO_2$ powder (204), and Ni-doped $SiO_2$ powder (206) have 001 refractions, which is an efficient match to a basal spacing of about 4.5 nm. Multiple 001 refractions (d 002 and d 003) are observed for the $SiO_2$, Zn-doped $SiO_2$, and Sc-doped $SiO_2$ samples, indicate a highly ordered layered structure. The XRD patterns of the $SiO_2$ (202), Zn-doped $SiO_2$ (208), and Sc-doped $SiO_2$ (210) are similar with only one dispersive broad peak, suggesting that the $SiO_2$, Zn-doped $SiO_2$, and Sc-doped $SiO_2$ are non-crystalline solids. One-hour heat treatment in air at 120° C. has no effect on the composition of the $SiO_2$ and Zn-doped $SiO_2$, and Sc-doped $SiO_2$. Heat treatment of the samples up to 120° C. does not cause any unusual behavior except in the case of the Co-doped $SiO_2$ (204) sample. A strong peak in the XRD pattern of the Sc-doped $SiO_2$ (210) marginally moves towards higher diffraction angles. The present finding also indicates that the Sc-doped $SiO_2$ occurs as a non-crystalline material, having ultrafine particles undetectable by the XRD.

After heat treatment at 120° C., the $SiO_2$ and Sc-doped $SiO_2$ did not show any signs of evolution. Hence, the samples were subjected only to the heat treatment at 120° C. for 24 hours, which produces a lower number of defects typical for sol-gel silica. In shape-stabilized phase change materials (ss-PCMs), also referred to as the samples/composites, an intense silica gel diffraction peak and two sharp PEG diffraction peaks at 19.281 and 23.361 are present showing that the ss-PCMs possess a composite structure produced by the crystallite PEG and amorphous silica gel. Furthermore, after the encapsulation of the PEG within the pores of the silica gel, discernible differences in the positions of the PEG peaks in the parent PEG and the ss-PCM are not observed, showing that the crystal structure of the PEG is not altered. The relative intensities of the peaks at 19.281 and 23.361 of the ss-PCMs are slightly lower than theoretically predicted values, indicating that silica gel interferes with the PEG crystal formation. Furthermore, the interference grows stronger as the mass fraction of the silica gel increases. At 60%, the amorphous PEG chains trapped within a network of the silica gel or absorbed on a surface of the silica gel are formed and the crystal structure of the PEG in ss-PCMs is not retained. The results indicate that the incorporation of the Co, Ni, Zn, or Sc in $SiO_2$ does not impact the crystal structure of the encapsulated PEG (as shown in FIG. 2B).

Figure 3B:
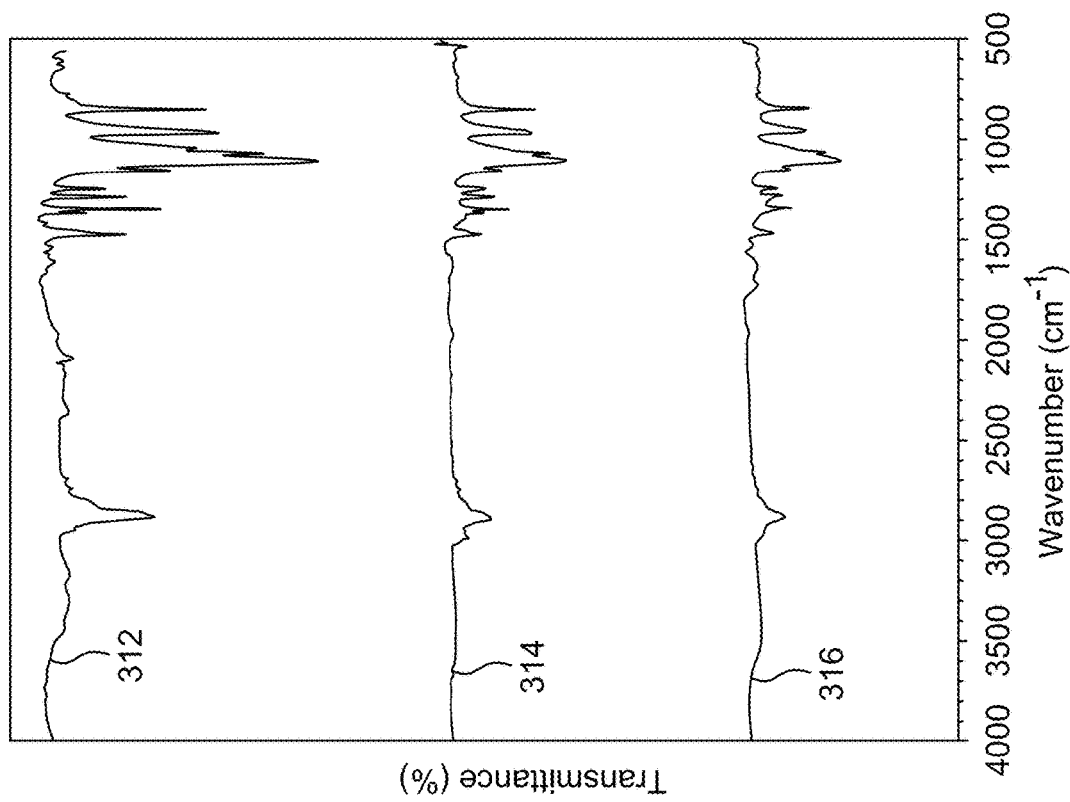
FIG. 3B is FT-IR spectra of the PEG/$SiO_2$, PEG/Zn—$SiO_2$, and PEG/Sc—$SiO_2$ samples, according to certain embodiments.
Figure 3A:
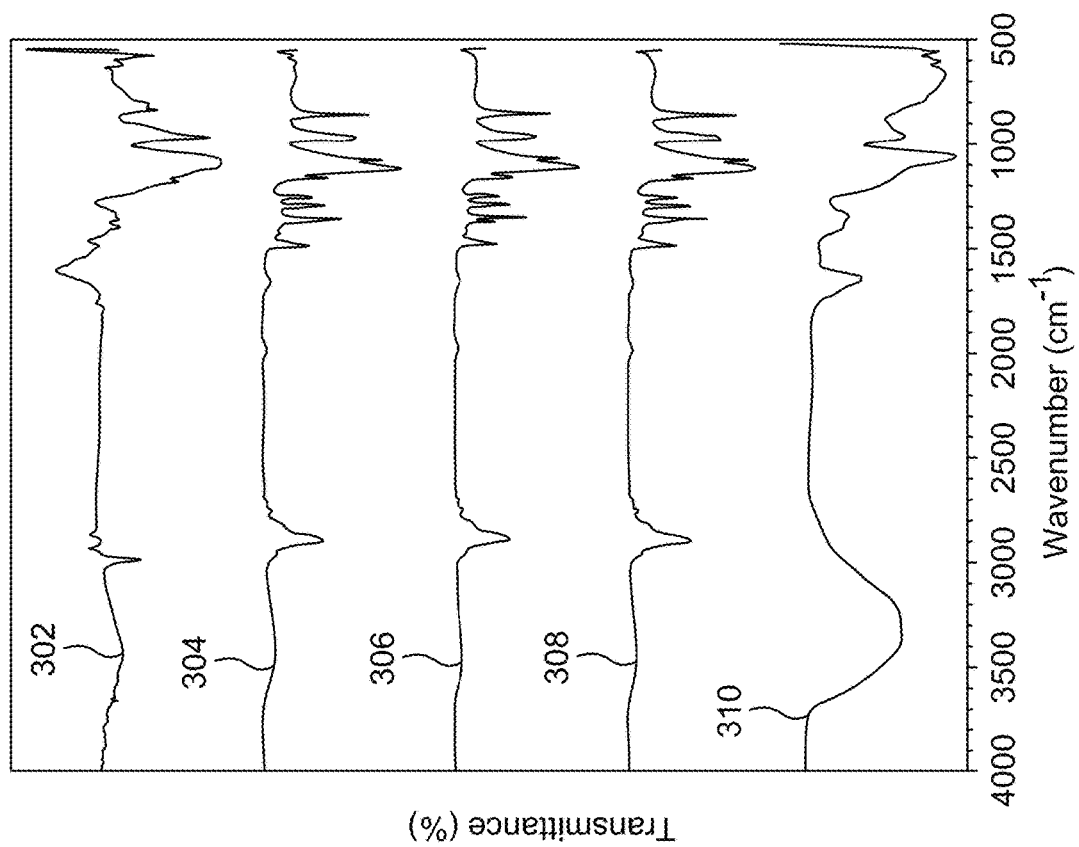
FIG. 3A is Fourier Transform Infrared Spectroscopy (FT-IR) spectra of the $SiO_2$, Co—$SiO_2$, Ni—$SiO_2$, Zn—$SiO_2$, and Sc—$SiO_2$ samples, according to certain embodiments.

Fourier transform infrared spectroscopy (FT-IR) spectra of $SiO_2$ (302), Co-doped $SiO_2$ (304), Ni-doped $SiO_2$ (306), Zn-doped $SiO_2$ (308), and Sc-doped $SiO_2$ (310) samples in the range of 4000-500 $cm^{-1}$ are shown in FIG. 3A. A peak of $\delta$SiO—H at 1636 $cm^{-1}$ has a slightly higher intensity in metal-containing $SiO_2$ than in $SiO_2$ alone, which may be attributed to the metal precursors, which are strong oxidizers, converting Si—OH group to the SiH-O. Most peaks in the Sc-doped $SiO_2$ are broader than the peaks of the other samples. In all the samples, a characteristic Si—O—Si band at 803 $cm^{-1}$ is present. As the spectra indicate, the intensity of the peak of the $SiO_2$ at 803 $cm^{-1}$ is higher than that of the other samples. In some embodiments, Si in Si—O—Si is substituted by the Ni, Co, Zn, and Sc to form Si—O—X. A peak observed at 669 $cm^{-1}$ in the metal-containing $SiO_2$ samples can be attributed to the Si—O—X (X=Ni, Co, Ni, Zn, and Sc) structural feature.

FIG. 3B depicts the FT-IR spectra of PEG/$SiO_2$ (312), PEG/Zn—$SiO_2$ (314) and PEG/Sc—$SiO_2$ (316). A peak at 1093 $cm^{-1}$ may be attributed to distortional vibrations of the Si—OH group. Peaks at 790 and 1061 $cm^{-1}$ may be attributed to asymmetric and symmetric stretching vibrations of the Si—O—Si bond, respectively. Peaks of the PEG at 2888 $cm^{-1}$, 1468 $cm^{-1}$, 1344 $cm^{-1}$, 1114 $cm^{-1}$, 962 $cm^{-1}$, and 842 $cm^{-1}$ are also present in the spectra of the ss-PCMs, indicating that the PEG is encapsulated in the $SiO_2$ network. A peak in a range of 3150-3559 $cm^{-1}$ may be attributed to the —OH vibration suggesting the presence of hydroxyl groups or adsorbed water. Peaks between 800 $cm^{-1}$ to 1500 $cm^{-1}$ can be attributed to the symmetric stretching vibration of C—O—C functional group. The peaks are shifted to a lower wavenumber, having a broad shape (for example, a broad crab leg shape), while the intensity of the peaks is slightly reduced, indicating a hydrogen bond between the Si—OH and the C—O—C of the PEG.

Absorption peaks at 2880 $cm^{-1}$, 1468 $cm^{-1}$, 1359 $cm^{-1}$, and 841 $cm^{-1}$ are attributed to —$CH_2$ of the PEG molecular chain. A plateau at 1094 $cm^{-1}$ is assigned to the C—O—C. Major peaks which can be attributed to signature functional groups of the PEG and $SiO_2$ appear in the spectra of the composites with only a minor shift in peak positions and relative strength, which can further be attributed to an intermolecular hydrogen bonding between the Si—OH of the $SiO_2$ and the hydroxyl groups of the PEG. Absence of extra peaks implies that the composite is made up of only the PEG and $SiO_2$, indicating that chemical reactions do not take place and only physical interactions are present between the PEG and the $SiO_2$ wall.

FIGS. 4A-4E show field emission scanning electron microscope (FE-SEM) images of the $SiO_2$, Co-doped $SiO_2$, Ni-doped $SiO_2$, Zn-doped $SiO_2$ and Sc-doped $SiO_2$ samples, respectively. Particles of the $SiO_2$ are of a plate shape, while particles of the Co—, Ni—, and Zn-doped $SiO_2$ samples have a similar plate morphology. However, size of the particles of the Co—, Ni—, and Zn-doped $SiO_2$ samples is larger than the size of the particles of the $SiO_2$. The Sc-doped $SiO_2$ sample has a wave-like morphology with a layered structure. Hydrolysis does not affect platelets of the Sc-doped $SiO_2$ sample, however, the particles of the Sc-doped $SiO_2$ sample swell slightly more than the particles of the $SiO_2$. In the Co- and Zn-doped samples, few amorphous $SiO_2$ particles were observed in the vicinity of platelets, indicating that the $SiO_2$ particles are rarely deposited on the external surface of clay-type platelets. At higher magnification, the $SiO_2$, Zn-doped $SiO_2$, and Sc-doped $SiO_2$ samples show soft type nano-sized particles (FIGS. 5A-5C, respectively).

Figure 4A:
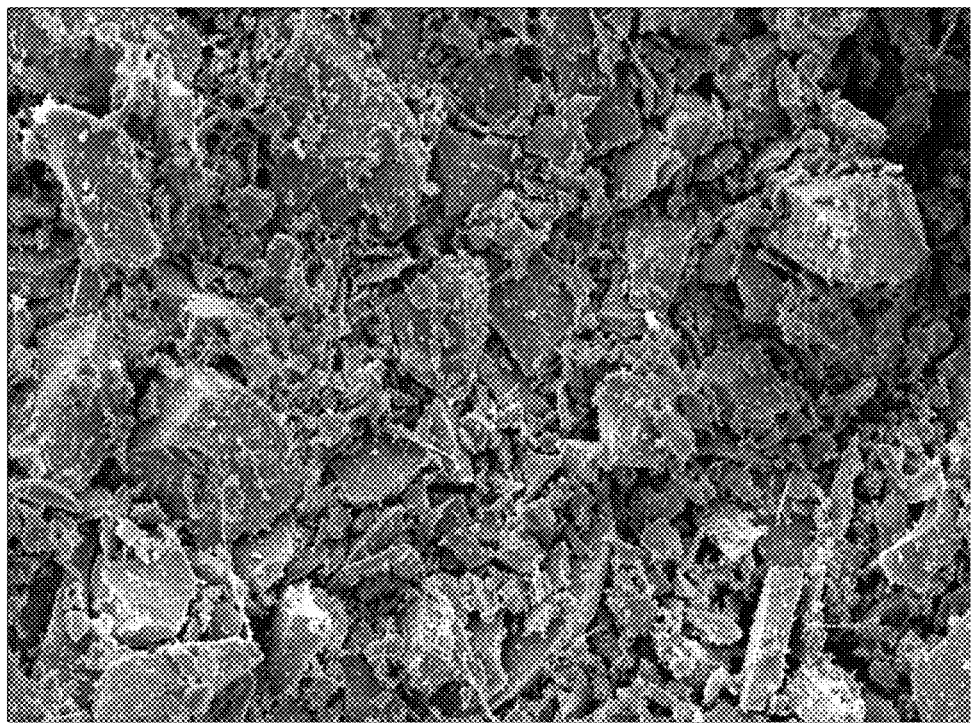
FIG. 4A is a field emission scanning electron microscope (FE-SEM) image of the $SiO_2$ sample, according to certain embodiments.
Figure 4B:
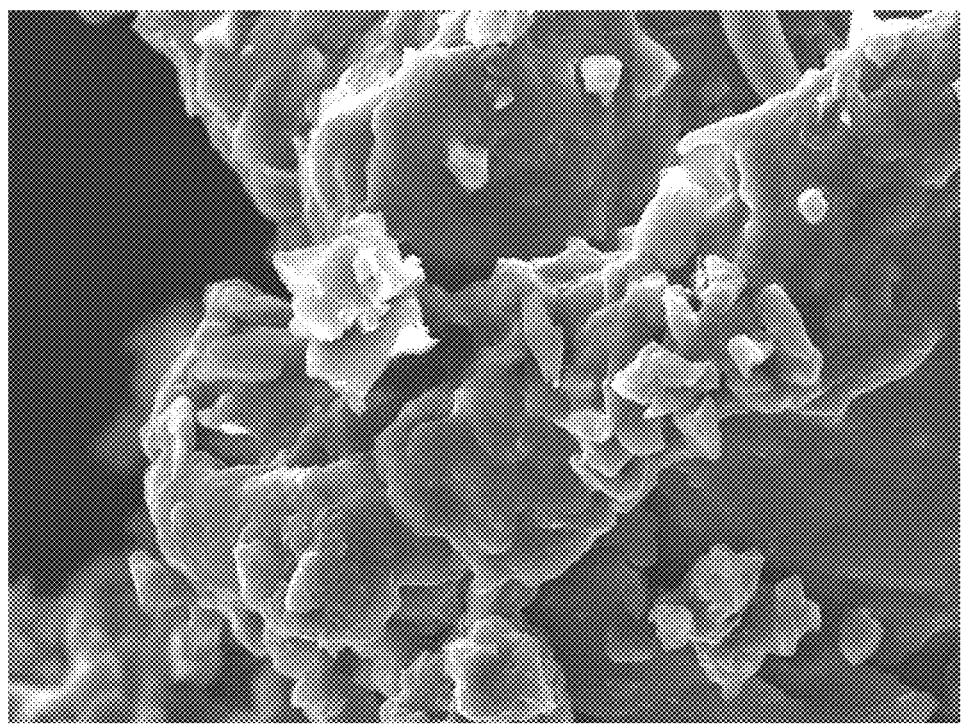
FIG. 4B is a FE-SEM image of the Co—$SiO_2$ sample, according to certain embodiments.
Figure 4C:
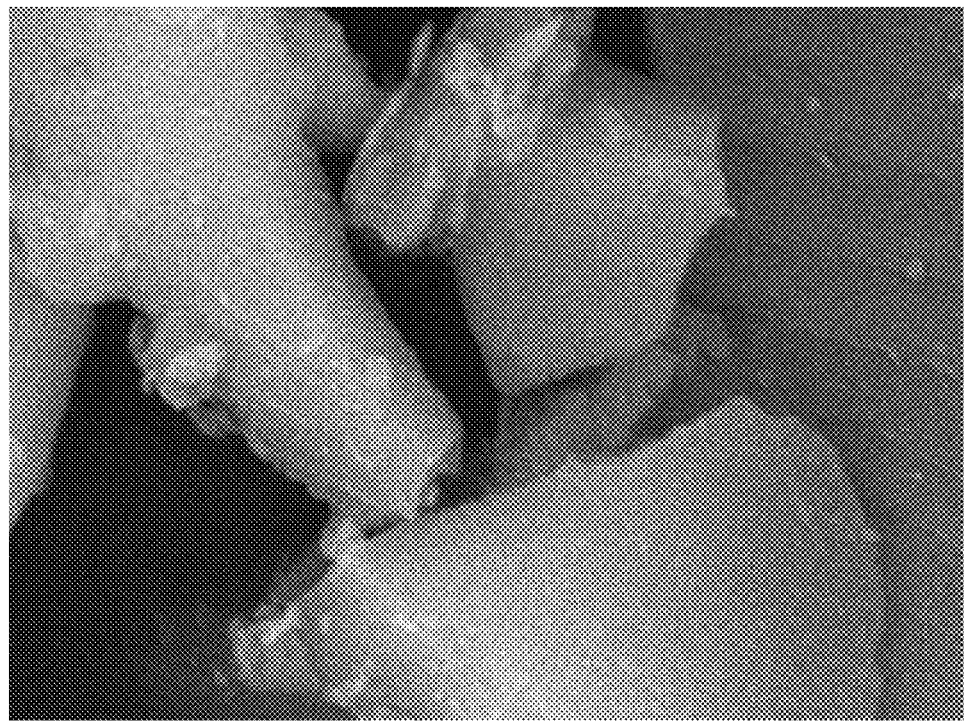
FIG. 4C is a FE-SEM image of the Ni—$SiO_2$ sample, according to certain embodiments.
Figure 4D:
FIG. 4D is a FE-SEM image of the Zn—$SiO_2$ sample, according to certain embodiments.
Figure 4E:
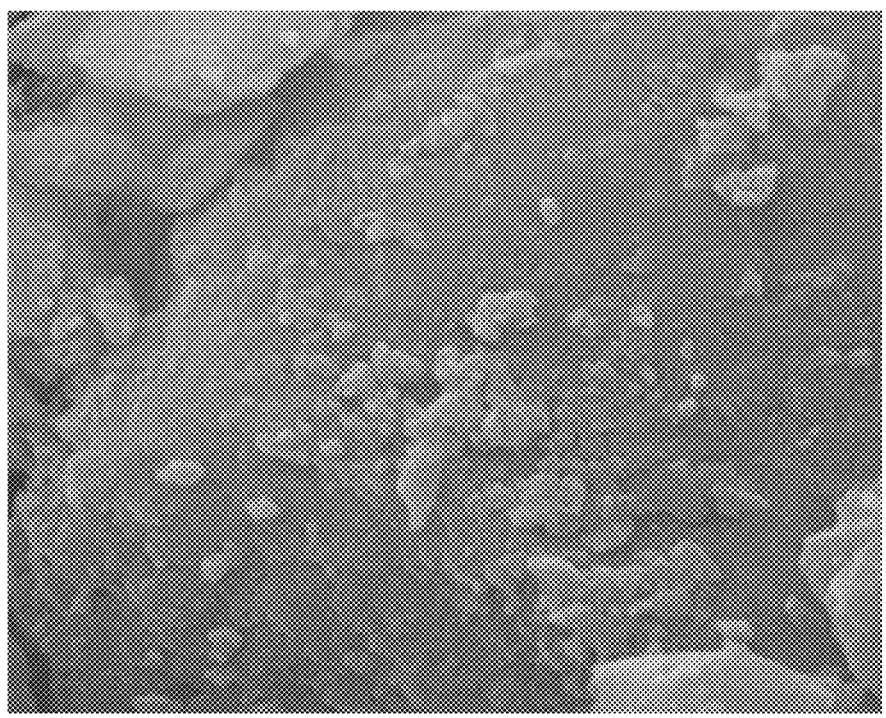
FIG. 4E is a FE-SEM image of the Sc—$SiO_2$ sample, according to certain embodiments.
Figure 5A:
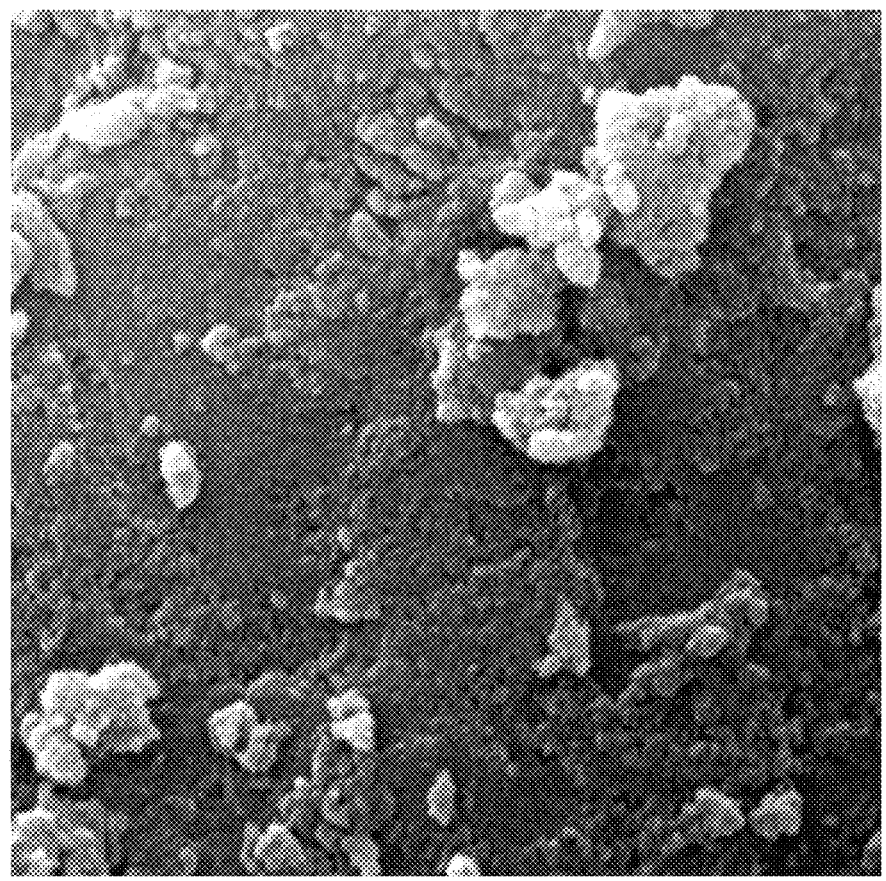
FIG. 5A is a E-SEM image of the $SiO_2$ sample at higher magnification, according to certain embodiments.
Figure 5B:
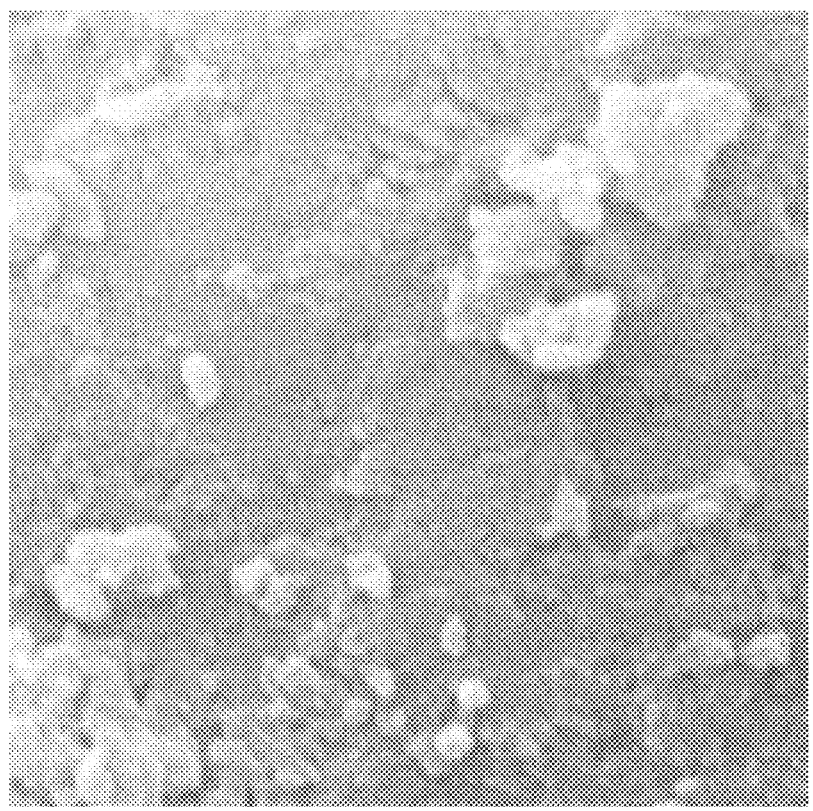
FIG. 5B is a FE-SEM image of the Zn—$SiO_2$ sample at higher magnification, according to certain embodiments.
Figure 5C:
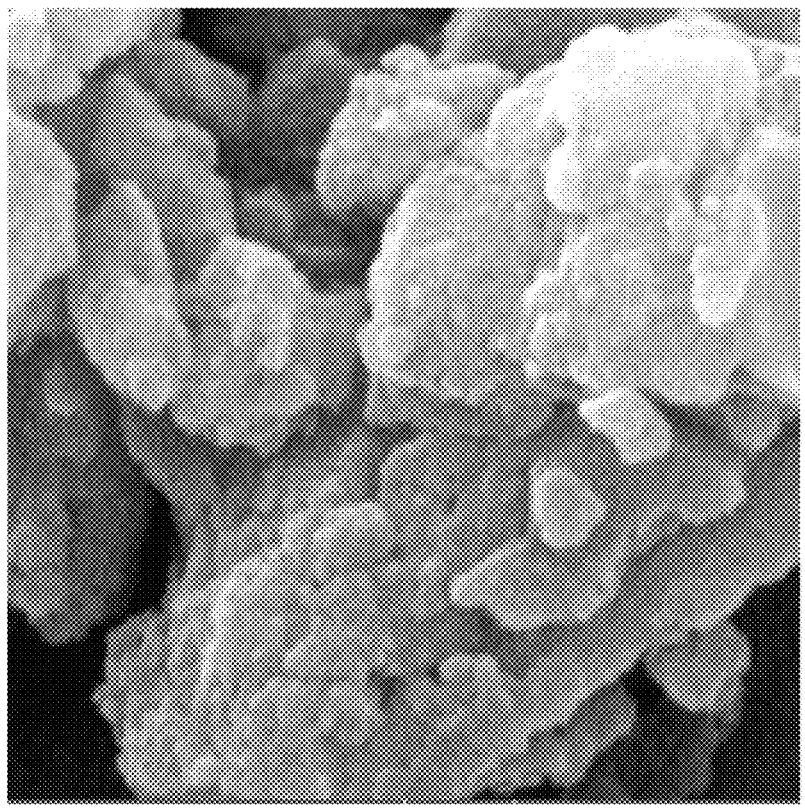
FIG. 5C is a FE-SEM image of the Sc—$SiO_2$ sample at higher magnification, according to certain embodiments.
Figure 6A:
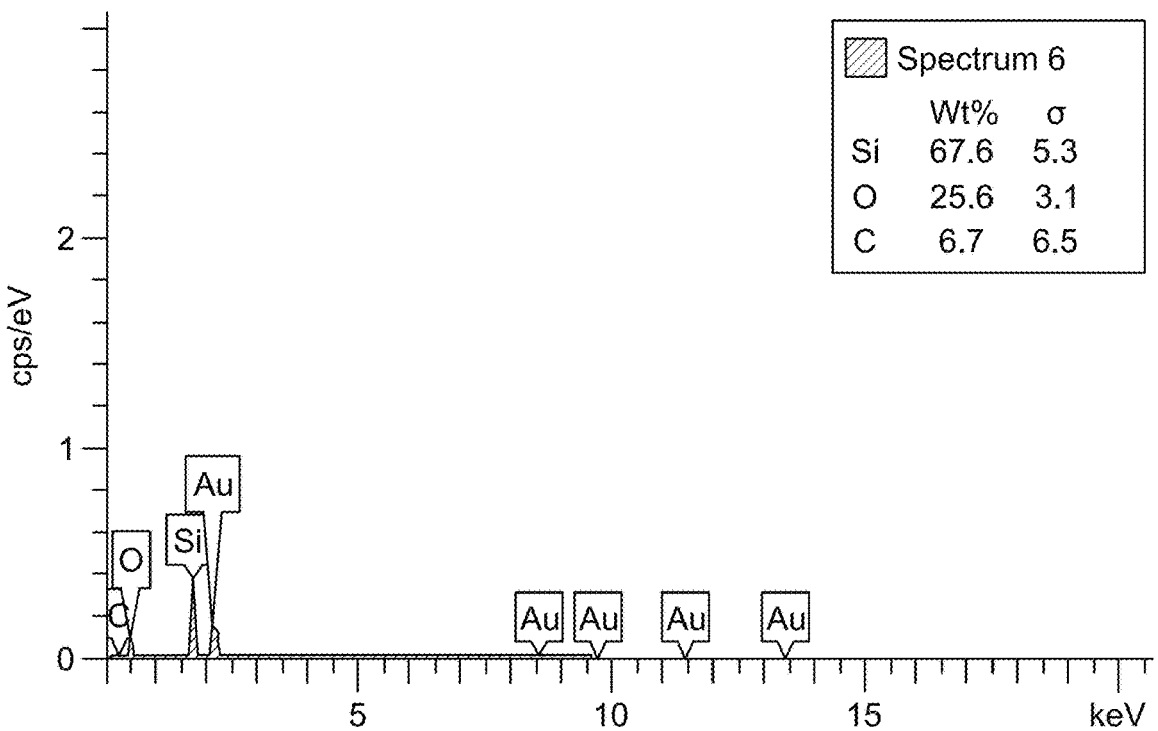
FIG. 6A is an energy dispersive spectra (EDS) of the $SiO_2$ sample, according to certain embodiments.
Figure 6B:
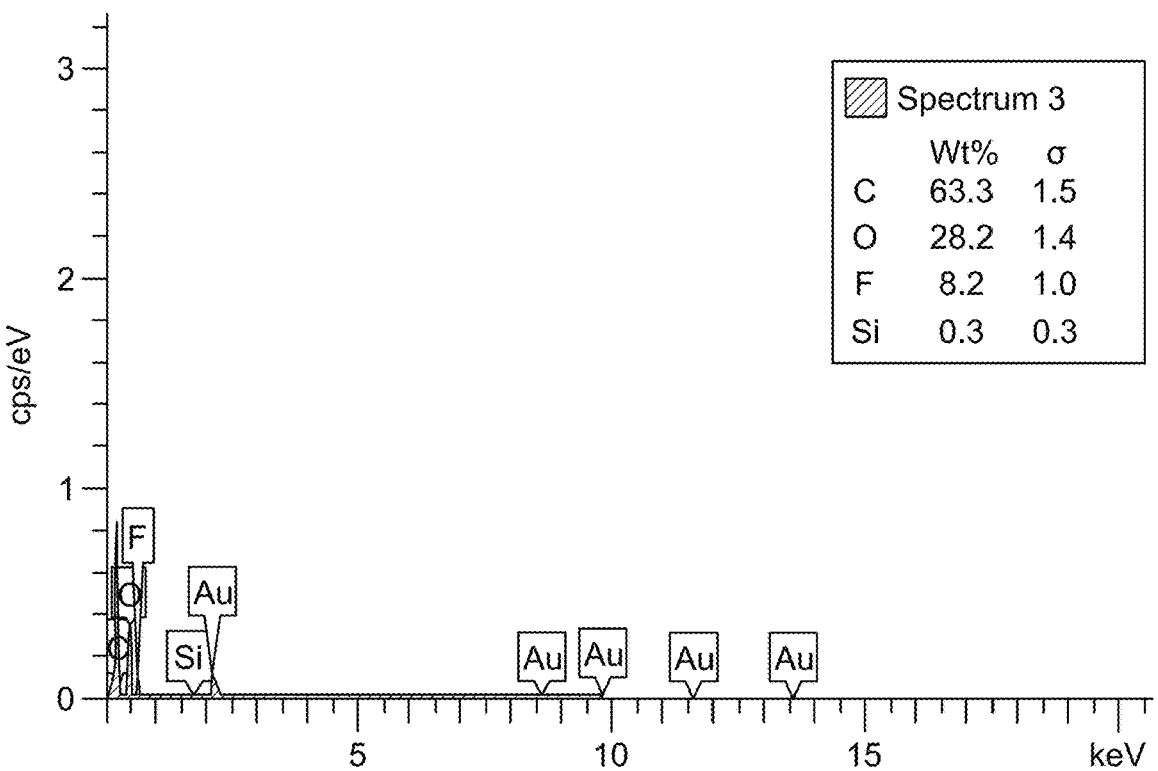
FIG. 6B is an EDS of the PEG/$SiO_2$ sample, according to certain embodiments.
Figure 6C:
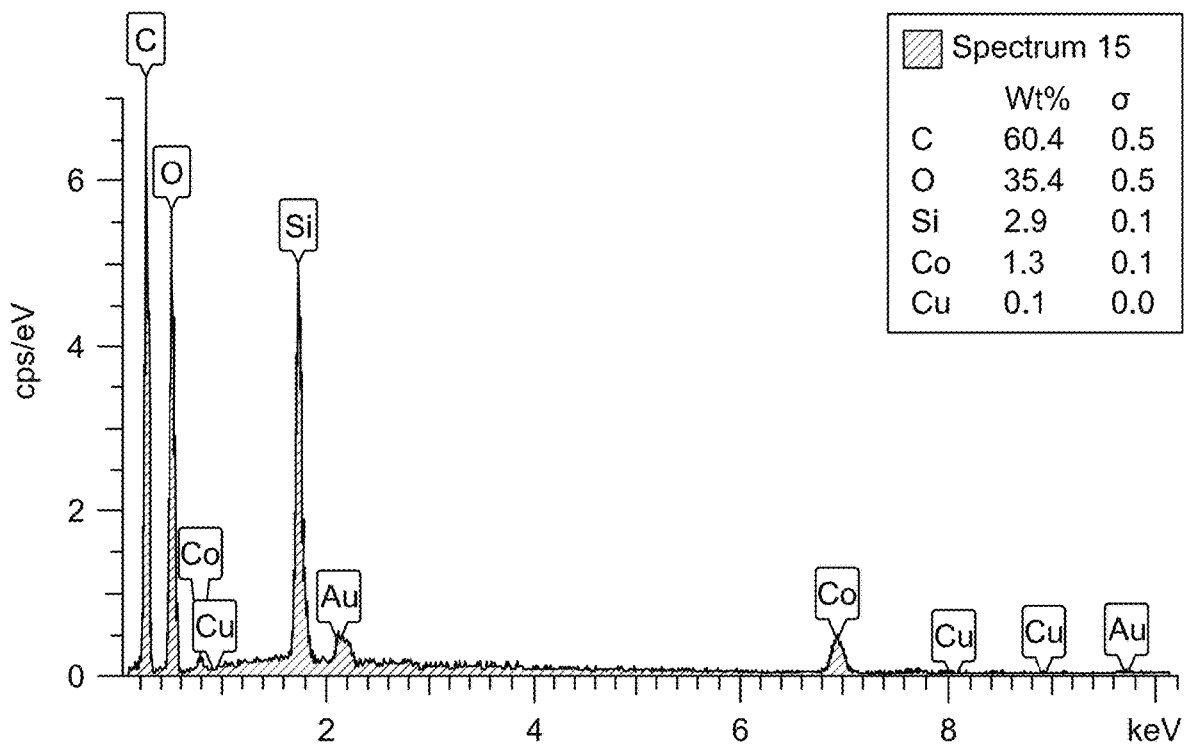
FIG. 6C is an EDS of the PEG/Co—$SiO_2$ sample, according to certain embodiments.
Figure 6D:
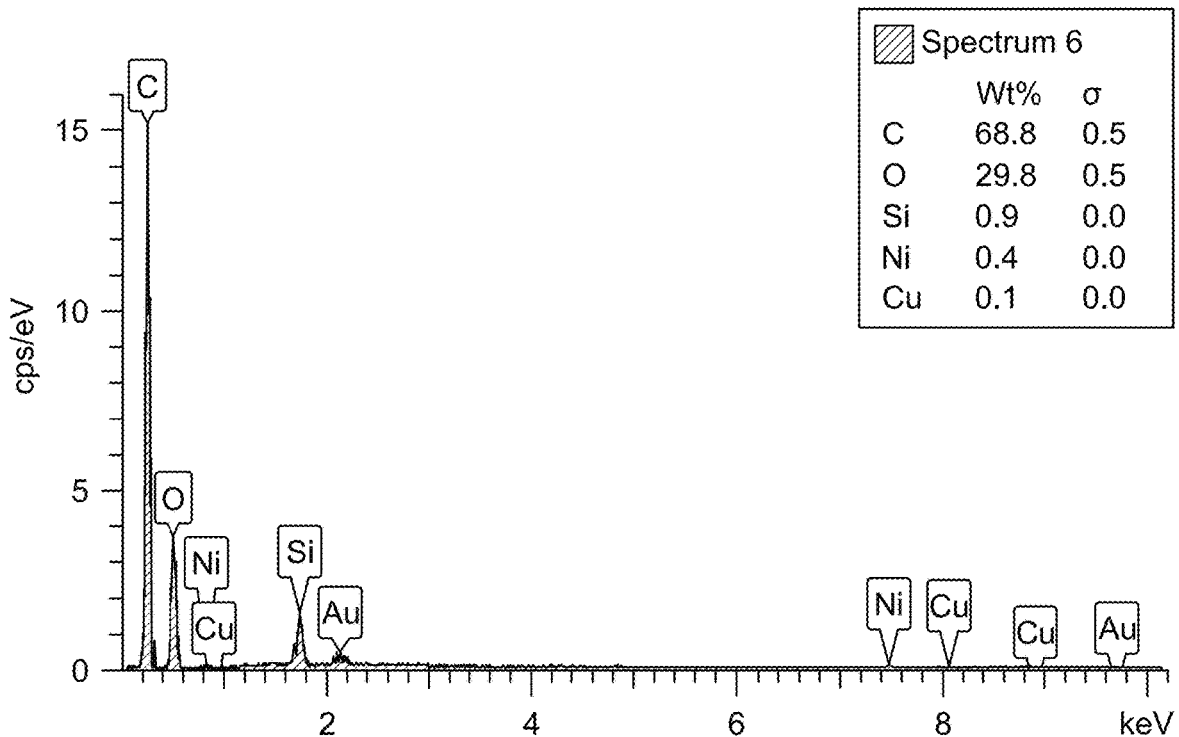
FIG. 6D is an EDS of the PEG/Ni—$SiO_2$ sample, according to certain embodiments.
Figure 6E:
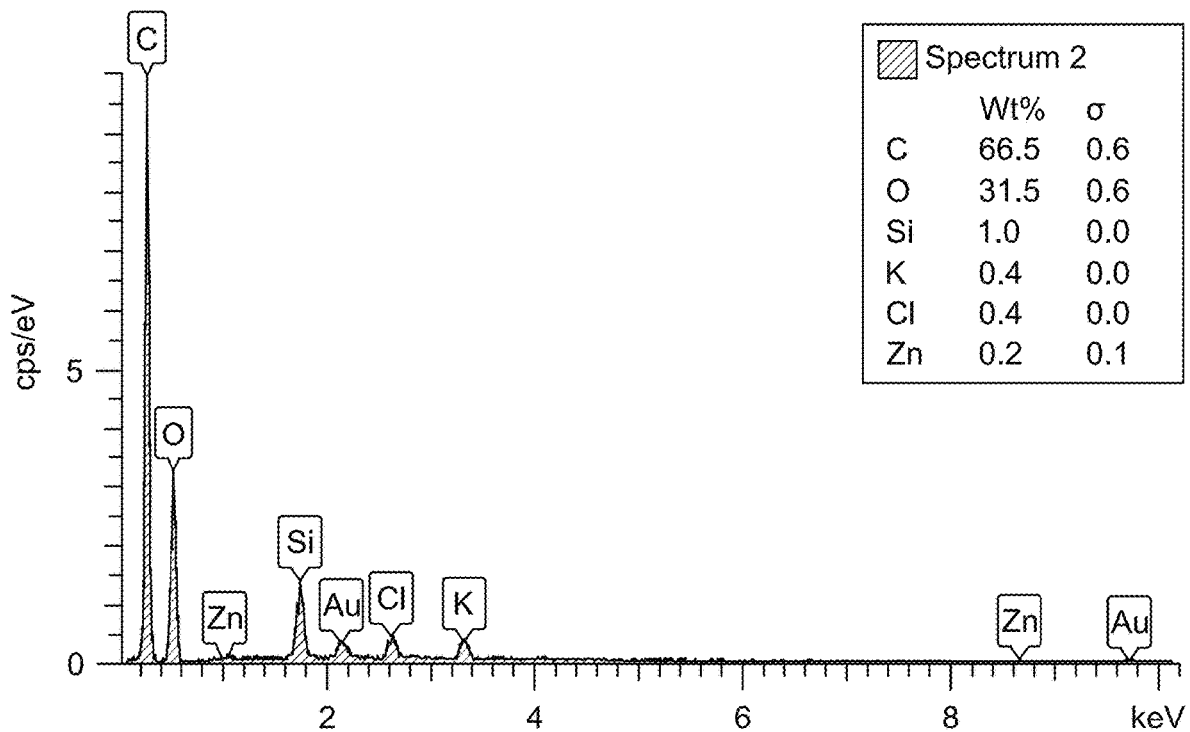
FIG. 6E is an EDS of the PEG/Zn—$SiO_2$ sample, according to certain embodiments.
Figure 6F:
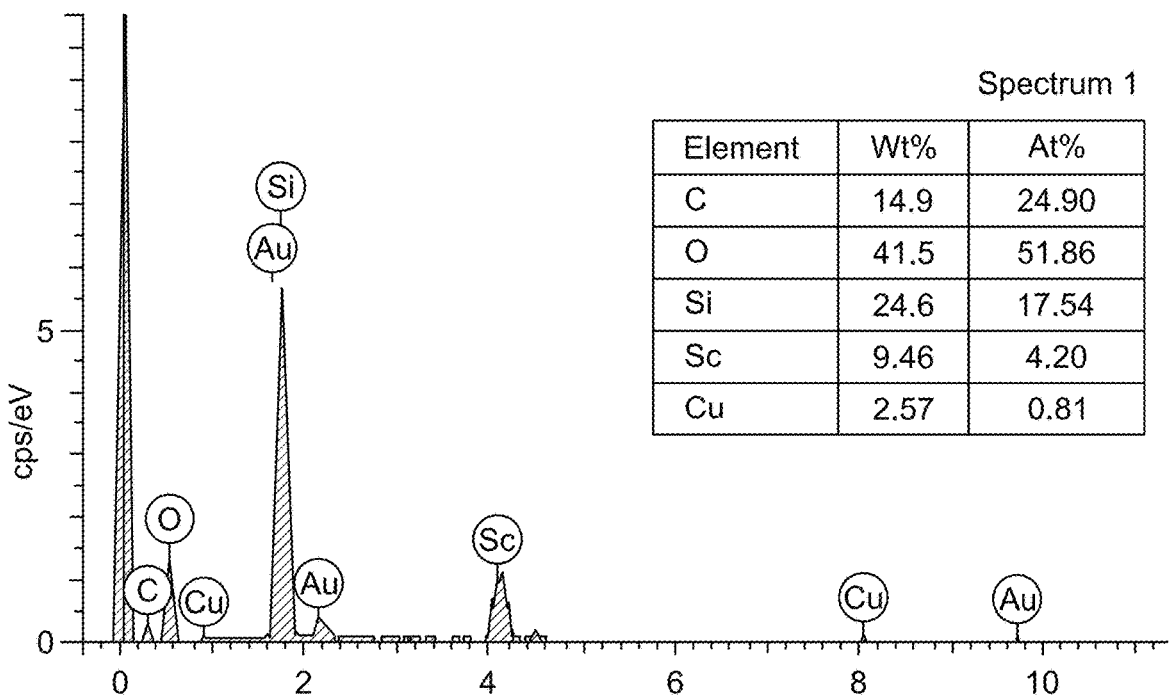
FIG. 6F is an EDS of the PEG/Sc—$SiO_2$ sample, according to certain embodiments.
Figure 7C:
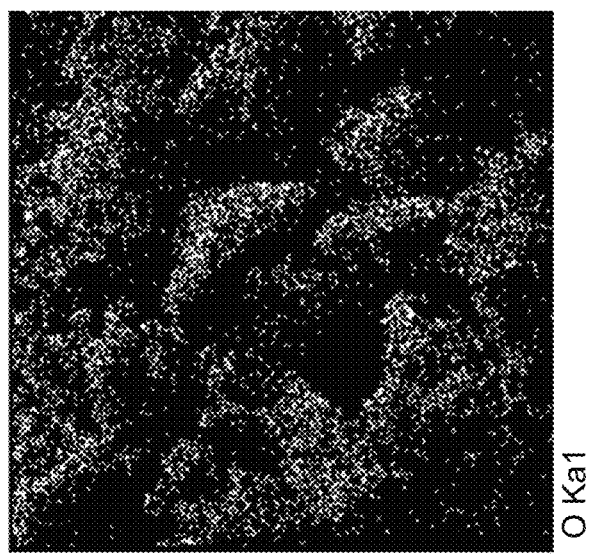
FIG. 7C is the elemental mapping of the PEG/Sc—$SiO_2$ sample representing O, according to certain embodiments.
Figure 7B:
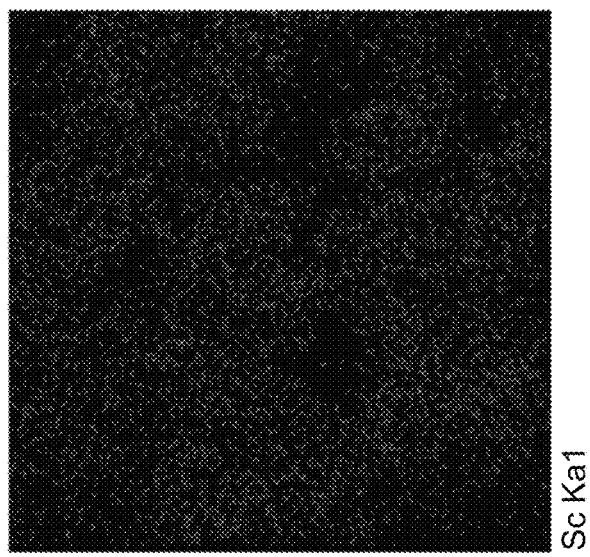
FIG. 7B is the elemental mapping of the PEG/Sc—$SiO_2$ sample representing Sc, according to certain embodiments.
Figure 7A:
FIG. 7A is an elemental mapping of the PEG/Sc—$SiO_2$ sample representing Si, according to certain embodiments.

FIG. 4A shows that the particles of the $SiO_2$ are uniformly distributed, and size of the particles of the $SiO_2$ is about 100 nm in the longest dimension. Average particle size of the $SiO_2$, Zn-doped $SiO_2$, and Sc-doped $SiO_2$ samples is about 100 nm in the longest dimension, and the particle distribution is uniform, as shown in FIGS. 5A-5C, respectively. Energy dispersive spectra (EDS) data of the $SiO_2$, PEG/$SiO_2$, PEG/Co—$SiO_2$, PEG/Ni—$SiO_2$, PEG/Zn—$SiO_2$, and PEG/Sc—$SiO_2$ samples are shown in FIGS. 6A-6F, respectively, which reveal the presence of Si, C, and O in the present samples. The EDS spectrum of the PEG/Sc—$SiO_2$ shows strong peaks associated with the Si, O, and Sc atoms. The composition of the samples corresponds to an elemental composition used in a preparation process. The lowest carbon weight percent among the tested samples were obtained for the PEG/Sc—$SiO_2$, which may be attributed to the ability of the Sc to scrape the carbon within the $SiO_2$ network. The elemental maps of the Sc—$SiO_2$ obtained using the EDS are shown in FIG. 7A-FIG. 7C. FIG. 7A-FIG. 7C represent the Si, Sc, and O elements which are evenly distributed and include negligible differences.

Figure 8:
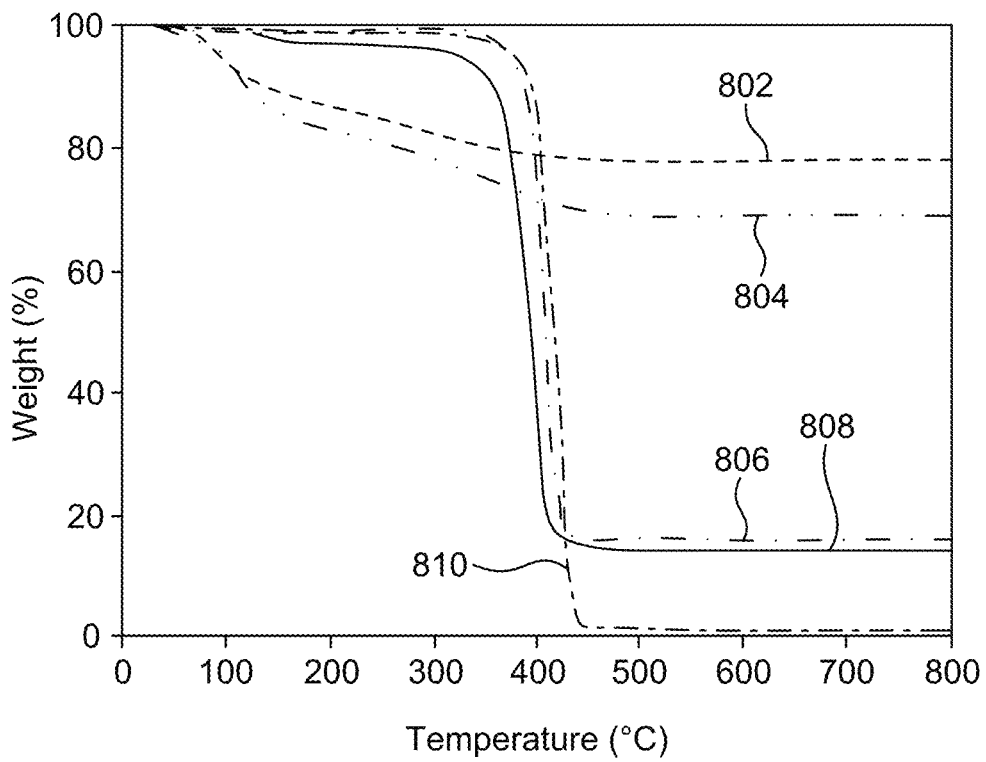
FIG. 8 is a graph depicting Thermogravimetric Analysis (TGA) curves of the Zn—$SiO_2$, Sc—$SiO_2$, PEG/Zn—$SiO_2$, and PEG/Sc—$SiO2$ samples and PEG-6000, according to certain embodiments.

Thermal stability of the PEG and ss-PCM composites, which plays an efficient role in the applications involving thermal energy storage, was evaluated to assess the activity of the ss-PCMs. Thermogravimetric analysis (TGA) curves of the ZnO-doped $SiO_2$ (802), Sc-doped $SiO_2$ (804), PEG/Zn-doped $SiO_2$ (806), PEG/Sc-doped $SiO_2$ (808), and PEG (810) samples are shown in FIG. 8. The TGA data were collected under an argon atmosphere at 5 degrees per minute (° C./min) heating rate.

FIG. 8 indicates that the decomposition which starts at room temperature (25° C.) is almost complete at about 600° C. At 600° C., the decomposition or removal of water leads to a weight loss of the Zn-doped $SiO_2$, and Sc-doped $SiO_2$ samples up to 20%, and 32%, respectively. Removal of the absorbed water and hydroxyl groups from a matrix, may have contributed to the weight loss of the matrix composite. The weight percentage of the composites remaining at 500° C. is about 18% and 17% for the Zn-doped $SiO_2$ and Sc-doped $SiO_2$ samples, respectively. Pure PEG starts to decompose at about 350° C., and the decomposition is complete (weight loss is 100%) at about 440° C. The weight loss of the composites occurs in the range of 400° C. to 640° C., which can be attributed to the removal of organic molecules. The PEG and PEG containing the ss-PCMs samples decompose in a single stage in a temperature range of 50 to 800° C.

Inorganic porous support matrices of the Zn-doped $SiO_2$ and Sc-doped $SiO_2$ samples enhance the thermal stability of the PEG by forming a protective shelter. The fabricated composites possess efficient thermal stability and hence have applications in energy storage systems. The results indicate that the Zn-doped $SiO_2$ and Sc-doped $SiO_2$ matrices inhibit the decomposition of the encapsulated PEG. The PEG/Zn—$SiO_2$ does not decompose in a temperature range of 25 to 390° C., indicating that the PEG/Zn—$SiO_2$ is thermally stable up to 390° C. Weight loss in the PEG/Sc—$SiO_2$ commences at about 140° C., with the major weight loss starting at about 320° C. and completing at about 400° C. The PEG permeates through the pores of the silica gel, enhancing the thermal stability of the ss-PCMs formed, which further allows the ss-PCMs to be employed over a wider temperature range.

The enhanced stability is attributed to the thermal stability of the silica gel networks and the intermolecular hydrogen bonding interactions between the silica gel and PEG. An initial breakdown temperature of the silica gel composites is lower than that of the PEG. The ss-PCMs possess higher starting decomposition temperatures when compared to the phase change temperatures of the ss-PCMs. Hence, the ss-PCMs demonstrate efficient thermal durability well beyond a melting temperature range of a PCM based on PEG (330-350° C.). The PCM based on the PEG has efficient thermal stability at temperatures below 263° C., which allows the use of PCMs for heat storage applications.

Figure 9A:
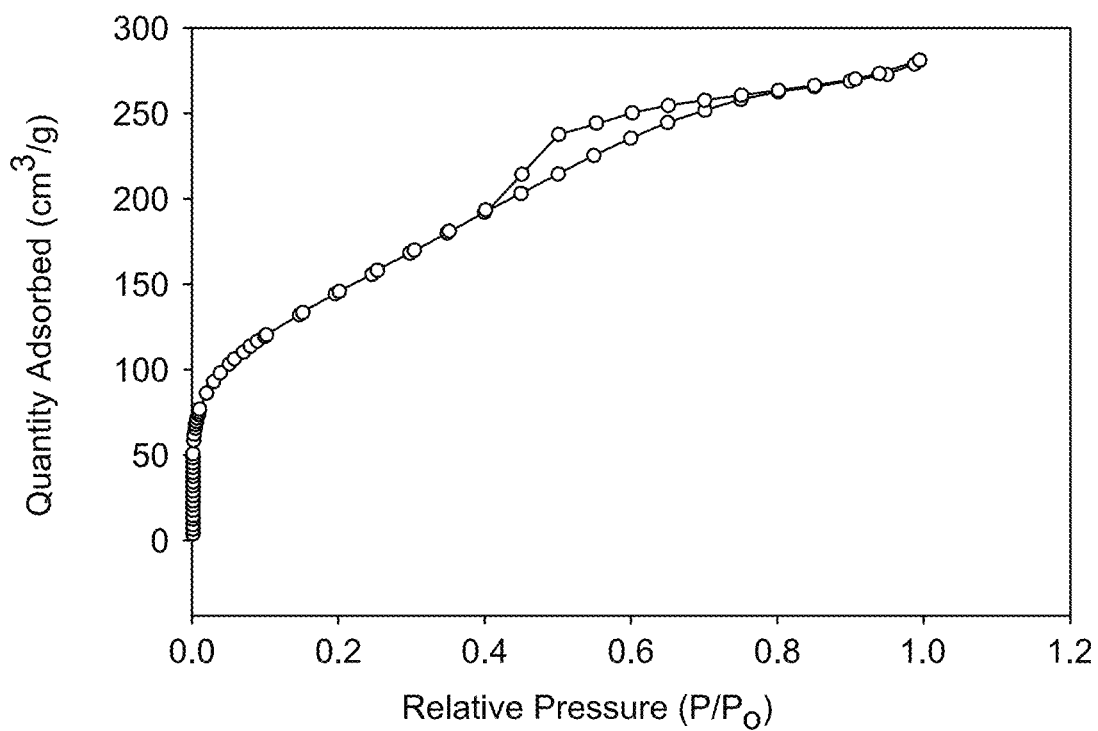
FIG. 9A is a graph depicting nitrogen adsorption-desorption isotherm of the Zn—$SiO_2$ sample, according to certain embodiments.
Figure 9B:
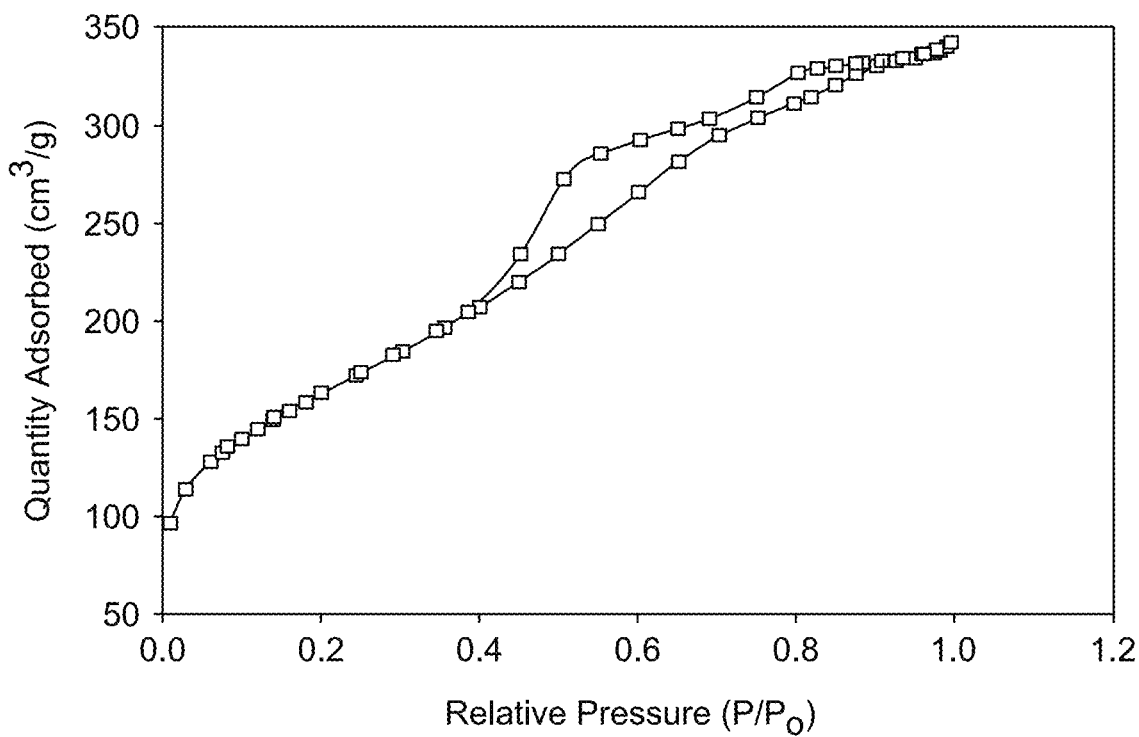
FIG. 9B is a graph depicting the nitrogen adsorption-desorption isotherm of the Sc—$SiO_2$, sample, according to certain embodiments.
Figure 9C:
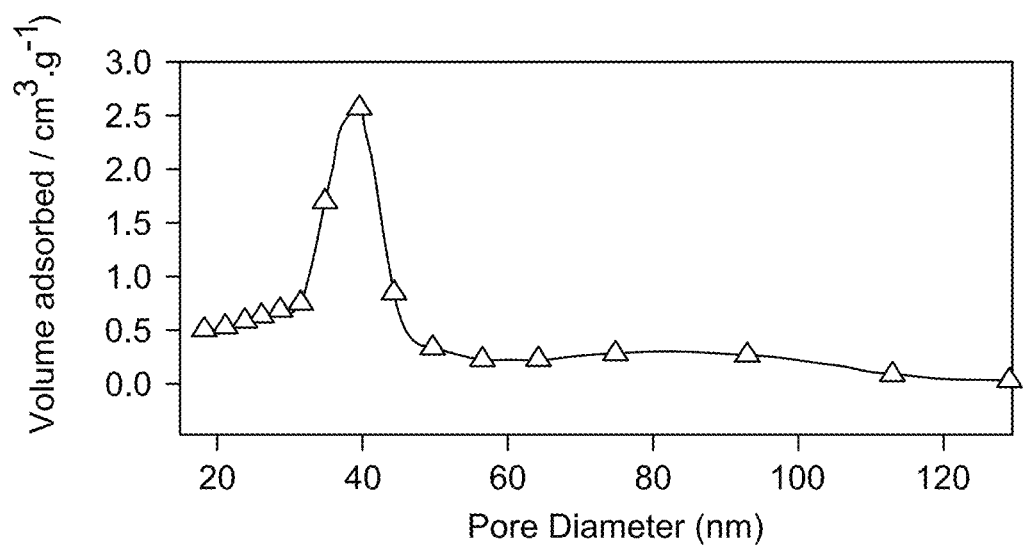
FIG. 9C is a graph depicting a pore size distribution of the Sc—$SiO_2$ sample, according to certain embodiments.
Figure 10A:
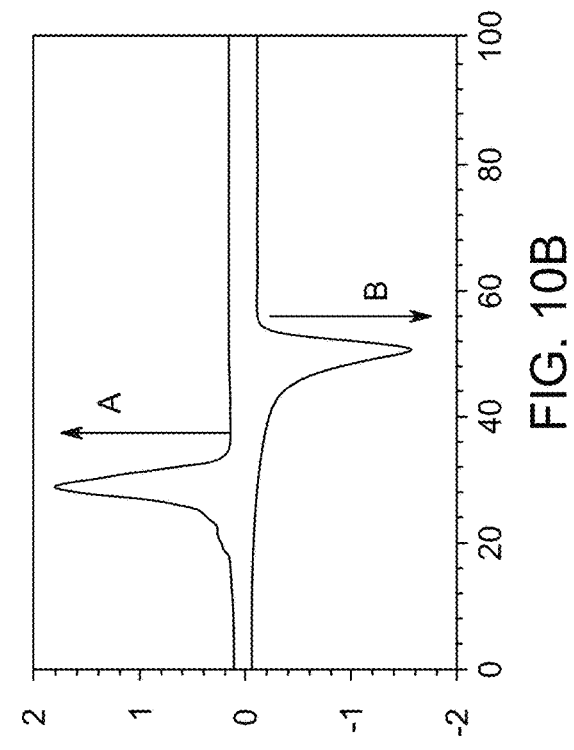
FIG. 10A is a graph depicting a differential scanning calorimetry (DSC) curve for melting and freezing enthalpies for the PEG/$SiO_2$, according to certain embodiments.
Figure 10B:
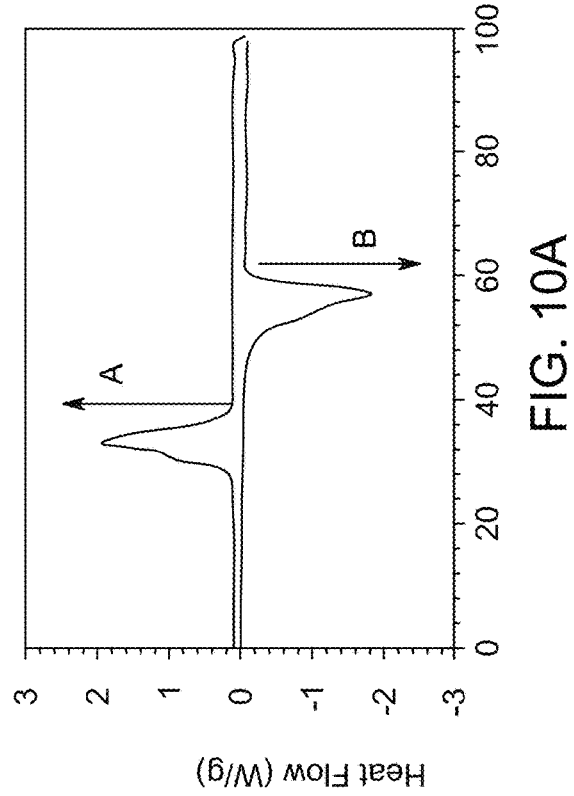
FIG. 10B is a graph depicting a DSC curve for melting and freezing enthalpies for the PEG/Co—$SiO_2$ sample, according to certain embodiments.
Figure 10C:
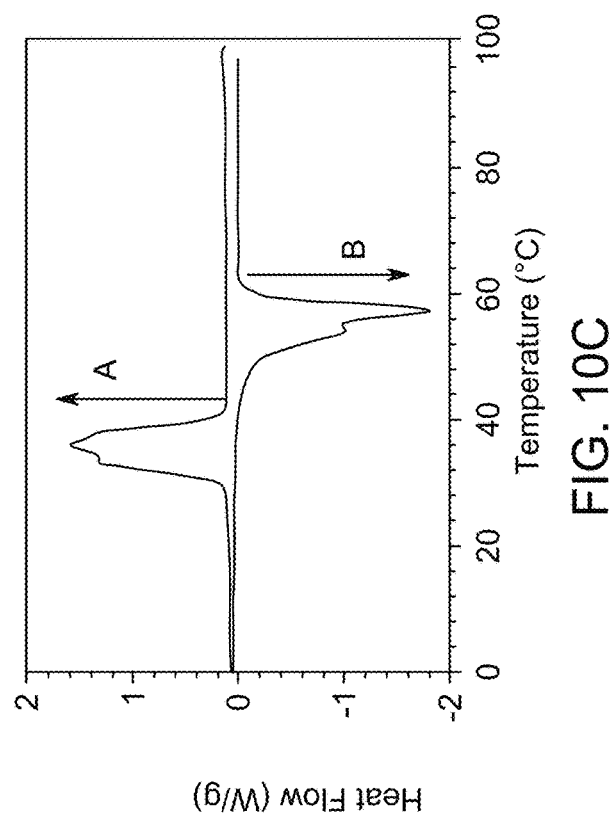
FIG. 10C is a graph depicting a DSC curve for melting and freezing enthalpies for the PEG/Ni—$SiO_2$ sample, according to certain embodiments.
Figure 10E:
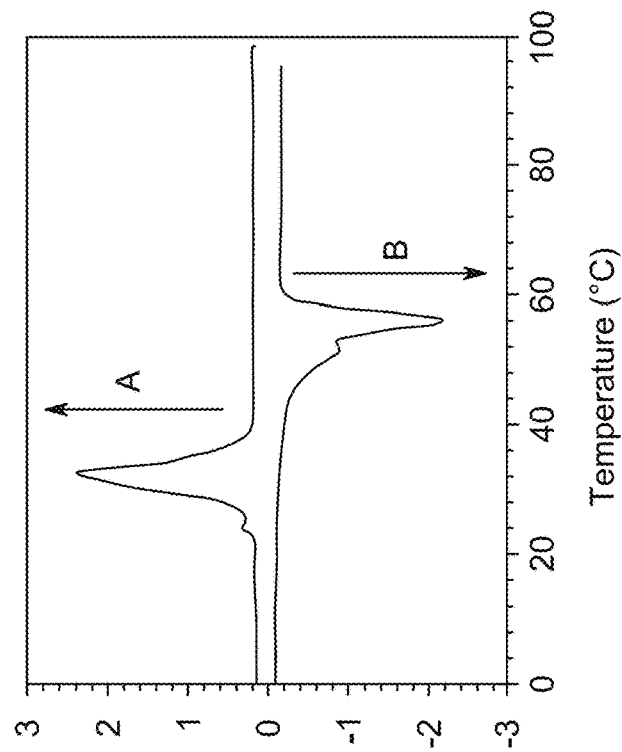
FIG. 10E is a graph depicting a DSC curve for melting and freezing enthalpies for the PEG/Sc—$SiO_2$ sample, according to certain embodiments.
Figure 10D:
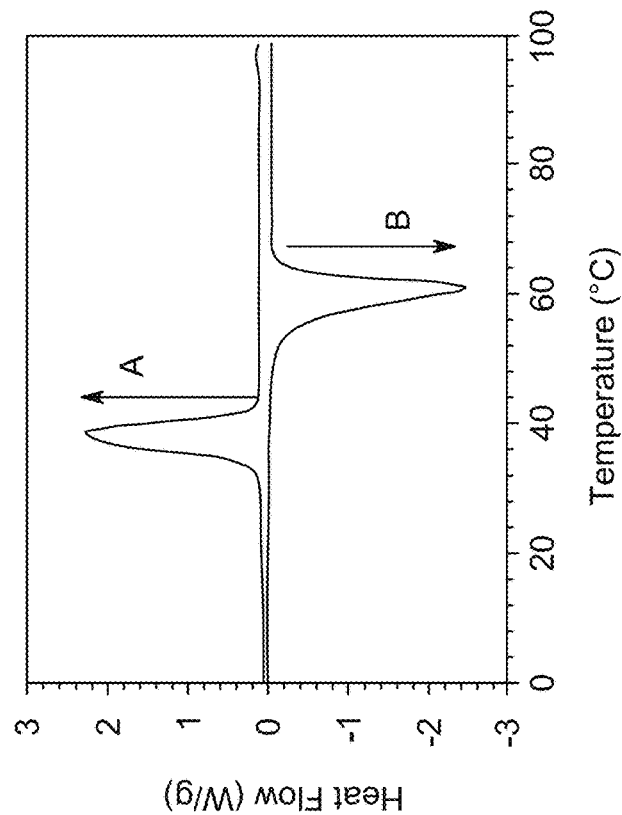
FIG. 10D is a graph depicting a DSC curve for melting and freezing enthalpies for the PEG/Zn—$SiO_2$ sample, according to certain embodiments.

FIG. 9A-FIG. 9B depict nitrogen adsorption-desorption isotherms of the Zn-doped $SiO_2$ and Sc-doped $SiO_2$ samples, respectively. FIGS. 9A-9B shows that the Zn-doped $SiO_2$ and Sc-doped $SiO_2$ follow a Type IV adsorption isotherm. Hysteresis loops indicate the presence of a mesoporous structure, which is an efficient support material for (shape-stabilized composite phase change materials) ss-CPCMs. Further, FIG. 9C shows a pore size distribution of the Sc-doped $SiO_2$ sample. FIG. 9C shows a broad curve with uniform pore distributions. Surface area of the Zn-doped $SiO_2$ and Sc-doped $SiO_2$ is 526.57 m²/g and 570.05 m²/g, respectively, and pore volume is 0.389 cm²/g and 0.5767 cm²/g, respectively. Higher latent heat value of the PCM based on the Sc-doped $SiO_2$ matrix may be attributed to the high pore volume of the Sc-doped $SiO_2$ sample, which allows the Sc-doped $SiO_2$ sample to retain a higher amount of the PEG, and the presence of mesopores.

FIG. 10A-FIG. 10E show differential scanning calorimetry (DSC) curves for melting and freezing enthalpies for the PEG/$SiO_2$, PEG/Co—$SiO_2$, PEG/Ni—$SiO_2$, PEG/Zn—$SiO_2$, and PEG/Sc—$SiO_2$, respectively. Enthalpies of the PEG and the composites were determined using an area under the DSC curves for melting and freezing cycles. 'A' and 'B' are endothermic and exothermic peaks. The melting and freezing enthalpies of the PEG are 189.6 J/g and 170.1 J/g, respectively. The composites show a partial loss of the latent heat of freezing and melting. The loss can be attributed to the presence of the matrix. The PCMs based on the composites of the PEG/$SiO_2$, PEG/Co—$SiO_2$, PEG/Ni—$SiO_2$, PEG/Zn—$SiO_2$, and PEG/Sc—$SiO_2$ exhibit an impregnation ratio (R) of 56.12%, 57.01%, 66.14%, 77.93%, and 82.17%, respectively (Table 2). The present behavior can be attributed to the heterogeneous nature of the composites, in which mixing or penetration of the PEG is less than desired. The present behavior can also be attributed to weaker peaks of melting and solidification of the composites as shown in FIGS. 10A-10E.

TABLE 2

Thermal activities of PEG, PEG/$SiO_2$, PEG/Co—$SiO_2$, PEG/Ni—$SiO_2$, PEG/Zn—$SiO_2$ and PEG/Sc—$SiO_2$ composites and comparison with that of PEG/$SiO_2$ in known public sources.

| S. NO. | Samples | $T_f$ (° C.) | $T_m$ (° C.) | $H_f$ (J/g) | $H_m$ (J/g) | $\Delta T$ (° C.) | R (%) | E (%) | $\Phi$ (%) | $\gamma$ (%) |
|---|---|---|---|---|---|---|---|---|---|---|
| 1 | PEG | 38.04 | 63.02 | 170.1 | 189.6 | 24.98 | | | | 100 |
| 2 | PEG/$SiO_2$ | 33.02 | 55.65 | 104.5 | 106.4 | 22.63 | 56.12 | 58.63 | 104.48 | 78.57 |
| 3 | PEG/Co—$SiO_2$ | 28.61 | 50.57 | 104.7 | 108.1 | 21.96 | 57.01 | 59.16 | 103.76 | 73.3 |
| 4 | PEG/Ni—$SiO_2$ | 35.85 | 57.3 | 118.9 | 125.4 | 21.45 | 66.14 | 67.92 | 102.69 | 99.21 |
| 5 | PEG/Zn—$SiO_2$ | 38.6 | 59.24 | 139.9 | 147.6 | 20.64 | 77.93 | 79.93 | 102.67 | 108.99 |
| 6 | PEG/Sc—$SiO_2$ | 33.01 | 52.01 | 153.1 | 155.8 | 19 | 82.17 | 85.17 | 104.51 | 105.65 |
| 7 | PEG/$SiO_2$ | 44 | 59 | 105.1 | 171 | 15 | | | | |
| 8 | PEG/$SiO_2$ | 23.3 | 36 | 118.3 | 122 | 12.7 | | | | |
| 9 | PEG/$SiO_2$ | — | 57.4 | — | 128.4 | — | | | | |
| 10 | PEG/Cu—$SiO_2$ | 45.8 | 58.2 | 102.8 | 100.4 | 12.4 | | | | |
| 11 | PEG/$Al_2O_3$—$SiO_2$ | 42 | 57.1 | 126.4 | 123.8 | 15.1 | | | | |
| 12 | PEG/$SiO_2$ | 42.34 | 58.09 | 141 | 151.8 | 15.75 | | | | |
| 13 | PEG/$SiO_2$ | 37.9 | 60.4 | 160.1 | 164.9 | 22.5 | | | | |
| 14 | PEG/SAM-4 | 39 | 59.5 | 113.5 | 116.3 | 20.5 | | | | |

Table 2 also lists parameters calculated using standard formulation, where, $T_f$ is freezing temperature, $T_m$ is melting temperature, $\Box H_m$ is melting latent heat, $T_f$ is freezing temperature, $\Box H_f$ is freezing latent heat, $\Delta T$ is supercooling, R is impregnation ratio, E is energy storage efficiency, $\varphi$ is energy storage capacity, $\gamma$ is heat storage efficiency and E is impregnation efficiency. The results reported for a few PCMs of the type similar to the PCs investigated in the present study are also included in Table 3 for comparison purposes.

$$E_{eff} = \frac{\Delta H_m, PCM}{x_{PEG}}; \qquad (1)$$

$$R = \frac{\Delta H_m, com}{\Delta H_m PCM} \times 100\%; \qquad (2)$$

$$E = \frac{\Delta H_m, com + \Delta H_f, com}{\Delta H_m, PCM + \Delta H_f, PCM} \times 100\%; \qquad (3)$$

In equations 1, 2, and 3 corn is the OA, SC or E×P matrix and PCM is the sum of matrix and the PEG.

The results indicate that the PEG/Zn—SiO$_2$ and PEG/Sc—SiO$_2$ perform better with an impregnation efficiency of 77.93% and 82.17%%, respectively, compared to other samples. Moreover, the impregnation efficiency (E %) of the PEG/Zn—SiO$_2$, and PEG/Sc—SiO$_2$ is also better, as shown in Table 2. Thermal storage capacity of the PEG/Sc—SiO$_2$ indicates that almost all the PEG molecules efficiently release/store energy during phase transition. As a result, a higher latent heat value of 155.8 J/g was obtained, which is higher than that of the other tested samples. Moreover, the latent heat value of the PEG/Sc—SiO$_2$ is also close to that of the PEG. The present value is also comparatively higher than the reported values shown in Table 2.

PEG-based PCMs have an ideal working temperature range which includes applications for providing comfort in buildings. In addition, the tested PCMs have a high energy storage efficiency, with a highest value of 96.48% (not shown in table 2, experimental data), which is an essential evaluation parameter. The efficiency values obtained for the PCMs investigated in the study are higher than the efficiency values reported in rows 7-14 of Table 2 as data of rows 7-14 were considered from public sources. An extent of supercooling ($\Delta T$), is determined based on the difference between the freezing and melting temperatures of the PEG, PEG/SiO$_2$, PEG/Co—SiO$_2$, PEG/Ni—SiO$_2$, PEG/Zn—SiO$_2$, and PEG/Sc—SiO$_2$ is 24.98° C., 22.63° C., 21.96° C., 21.45° C., 20.64° C., and 19.00° C., respectively. The largest reduction in supercooling of 25.5% is observed for the PEG/Sc—SiO$_2$. The XRD patterns shown in FIG. 2B indicates that the PEG/Sc—SiO$_2$ (212) has the largest decrease in peak height among the PEG/Zn—SiO$_2$ (214), PEG/Ni—SiO$_2$ (216), PEG/Co—SiO$_2$ (218), PEG/SiO$_2$ (220), when compared to that of the PEG. The results indicate that a larger portion of the PEG is encapsulated in the porous structure of the PEG/Sc—SiO$_2$ compared to the PEG/SiO$_2$, PEG/Co—SiO$_2$, PEG/Ni—SiO$_2$, and PEG/Zn—SiO$_2$. The higher melting and solidification latent heats of the PEG/Sc—SiO$_2$ support the present conclusion. Furthermore, lack of any vapor or gas formation during a melting cycle is noteworthy. Further, voids are not created during a freezing process.

TABLE 3

Thermal conductivity of PEG, PEG/Zn—SiO$_2$, and PEG/Sc—SiO$_2$.

| S. No. | Material | Thermal Conductivity (Wm$^{-1}$K$^{-1}$) |
|---|---|---|
| 1 | PEG | 0.23 |
| 2 | PEG/Zn—SiO$_2$ | 0.6532 |
| 3 | PEG/Sc—SiO$_2$ | 0.5731 |
| 4 | PEG/SiO$_2$ | 0.5581 |
| 5 | PEG/Cu—SiO$_2$ | 0.4141 |
| 6 | PEG/SiO$_2$—Al$_2$O$_3$ | 0.435 |
| 7 | PEG/SiO$_2$ | 0.5124 |
| 8 | PEG/SAM-4 | 0.48 |

Table 3 depicts that the thermal conductivity of the PEG/SiO$_2$ is 0.5124 W/m$^{-1}$K$^{-1}$ (row 7, as data was considered from public sources). Further, the thermal conductivity of the PEG/Cu—SiO$_2$ is of 0.414 W/m$^{-1}$K$^{-1}$ (row 8, as data was considered from public sources). The highest reported thermal conductivity value for the PEG/SiO$_2$ of 0.558 W/m$^{-1}$K$^{-1}$ is obtained by adding graphite. The latent heat value of melting of PEG/SiO$_2$/graphite system is low at 128.4 J/g. As the thermal conductivity of ZnO is calculated to be 50 W/m$^{-1}$K$^{-1}$ at RT, adding the ZnO improves the thermal conductivity of the PEG/SiO$_2$. Furthermore, the thermal conductivity of the PEG/Zn—SiO$_2$ is higher than that of the PEG or SiO$_2$ alone, and ZnO-doped SiO$_2$ was expected to serve as an efficient matrix.

Therefore, combining inorganic materials (ZnO and SiO$_2$) provides a suitable matrix for ss-PCM applications. The thermal conductivity of the PEG/ZnO—SiO$_2$ and PEG/Sc—SiO$_2$ determined in the present study is 0.6532 W/m$^{-1}$K$^{-1}$ and 0.5731 W/m$^{-1}$K$^{-1}$, respectively. The improvement of the thermal conductivity of the PEG/Zn—SiO$_2$ may be attributed to the presence of highly conductive the ZnO inside the thermally conductive SiO$_2$ network, which may enhance the intermolecular forces.

Uniform distribution of the ZnO particles in the PEG/Zn—SiO$_2$ compared to the other composites also contributes to the higher thermal conductivity of the PEG/Zn—SiO$_2$. Further, high density may lead to a fast transfer of the heat. The increased thermal conductivity of the PEG/Zn—SiO$_2$ can also be attributed to the higher density of the PEG/Zn—SiO$_2$. Hence, the presence of the Zn—SiO$_2$ in the PCM composite significantly improves the thermal conductivity without affecting the compatibility, thermal stability, or TES properties of the PCM. Enhancement of the thermal conductivity of the PEG/Sc—SiO$_2$ is substantially higher than that of the PEG/Cu—SiO$_2$.

Figure 11A:
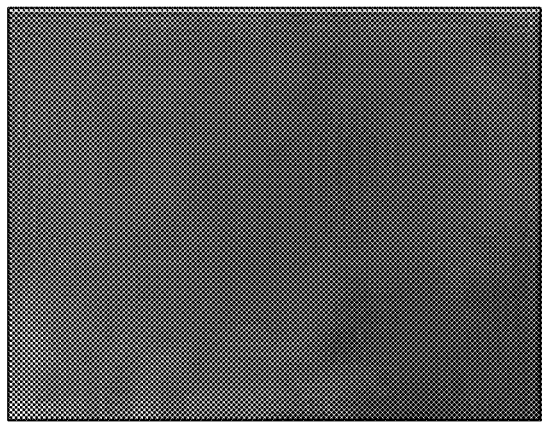
FIG. 11A is an image of a copper sheet, according to certain embodiments.
Figure 11B:
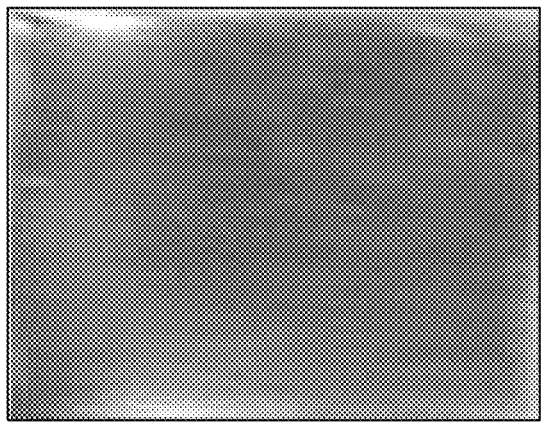
FIG. 11B is an image of an aluminum sheet, according to certain embodiments.
Figure 11C:
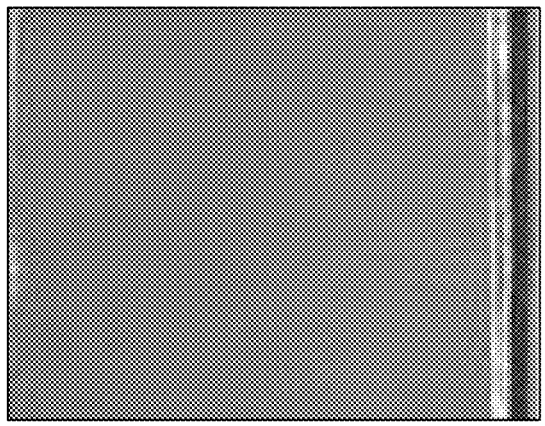
FIG. 11C is an image of a zinc sheet, according to certain embodiments.
Figure 11D:
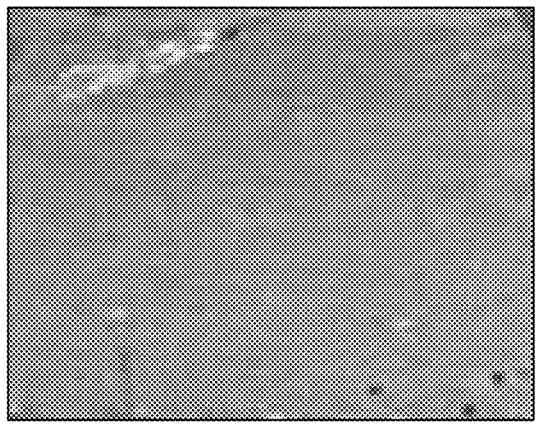
FIG. 11D is an image of a stainless steel sheet, according to certain embodiments.
Figure 11E:
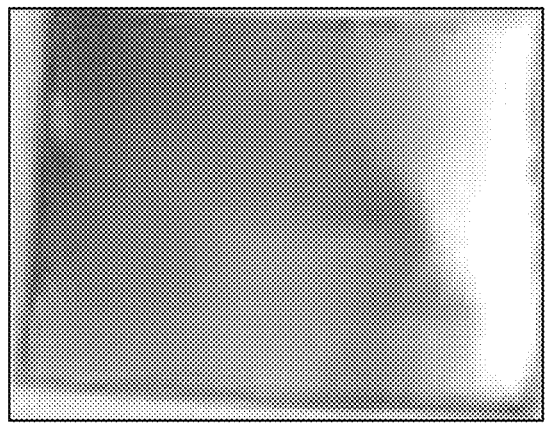
FIG. 11E is an image of a galvanized iron sheet, according to certain embodiments.
Figure 11F:
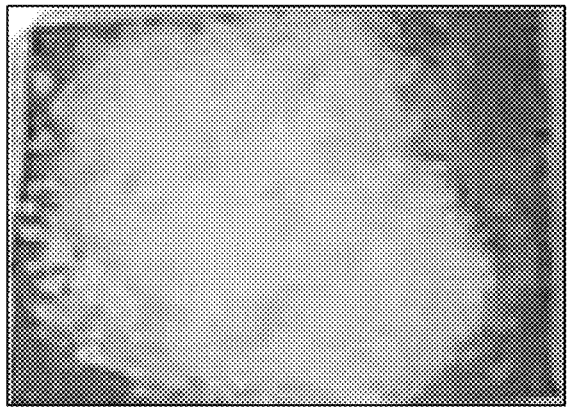
FIG. 11F is an image of a compatibility test of the copper sheet with the PEG/$SiO_2$ sample, according to certain embodiments.
Figure 11G:
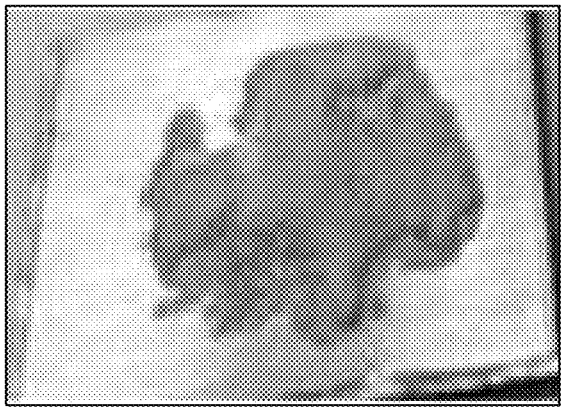
FIG. 11G is an image of a compatibility test of the aluminum sheet with the PEG/$SiO_2$ sample, according to certain embodiments.
Figure 11H:
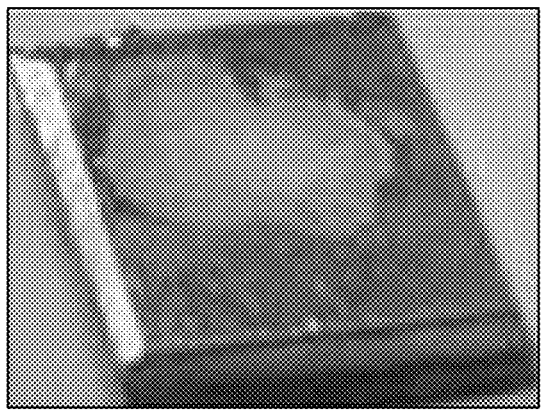
FIG. 11H is an image of a compatibility test of the zinc sheet with the PEG/$SiO_2$ sample, according to certain embodiments.
Figure 11I:
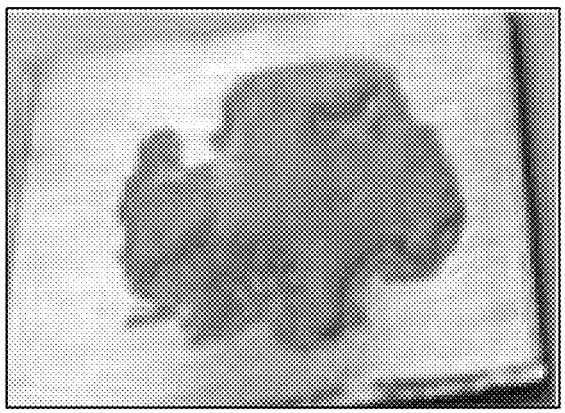
FIG. 11I is an image of a compatibility test of the stainless steel sheet with the PEG/$SiO_2$ sample, according to certain embodiments.
Figure 11J:
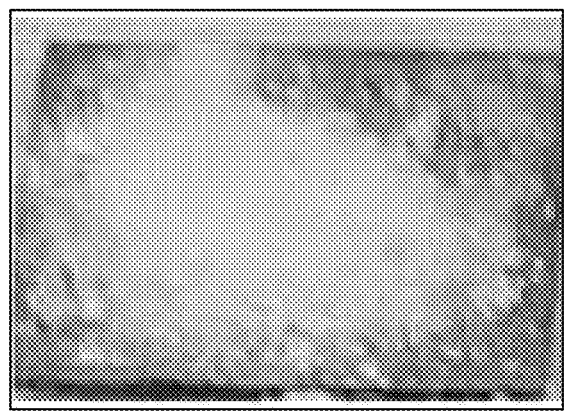
FIG. 11J is an image of a compatibility test of the galvanized iron sheet with the PEG/$SiO_2$ sample, according to certain embodiments.
Figure 11K:
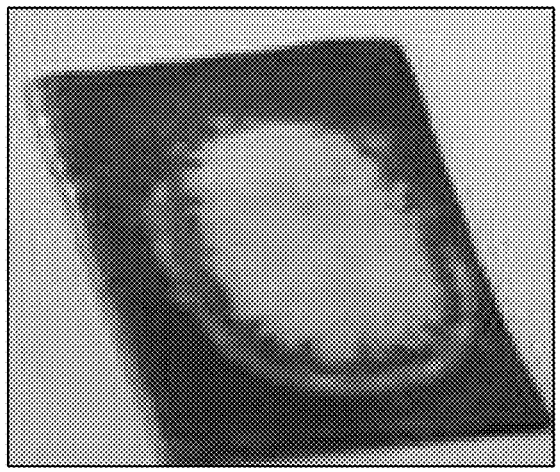
FIG. 11K is an image of a compatibility test of the copper sheet with the PEG/Zn—$SiO_2$ sample, according to certain embodiments.
Figure 11L:
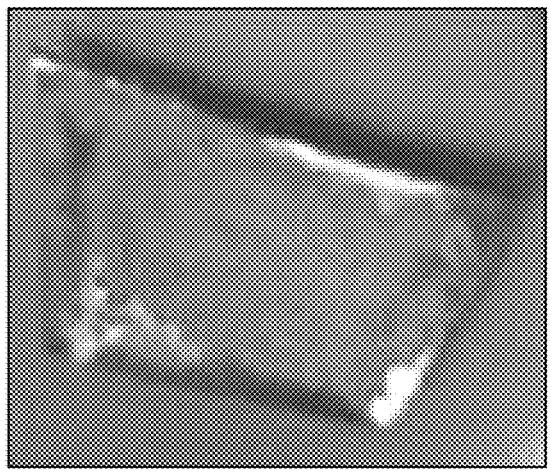
FIG. 11L is an image of a compatibility test of the aluminum sheet with the PEG/Zn—$SiO_2$ sample, according to certain embodiments.
Figure 11M:
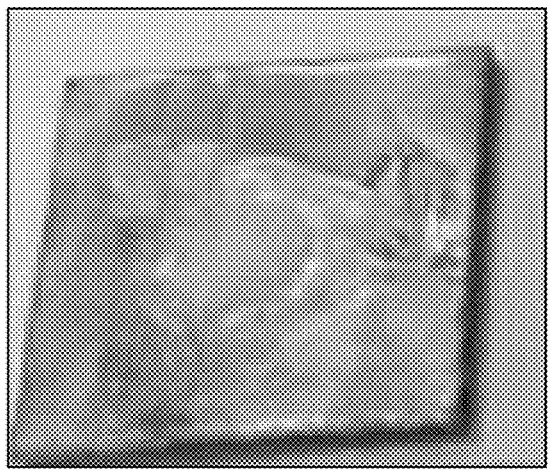
FIG. 11M is an image of a compatibility test of the zinc sheet with the PEG/Zn—$SiO_2$ sample, according to certain embodiments.
Figure 11N:
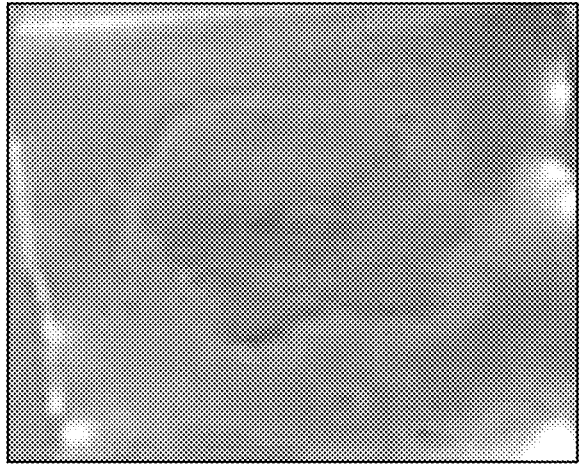
FIG. 11N is an image of a compatibility test of the stainless steel with the PEG/Zn—$SiO_2$ sample, according to certain embodiments.
Figure 11O:
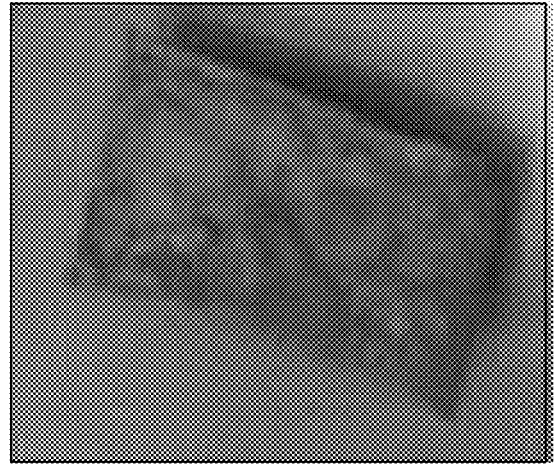
FIG. 11O is an image of a compatibility test of the galvanized iron sheet with the PEG/Zn—$SiO_2$ sample, according to certain embodiments.
Figure 11P:
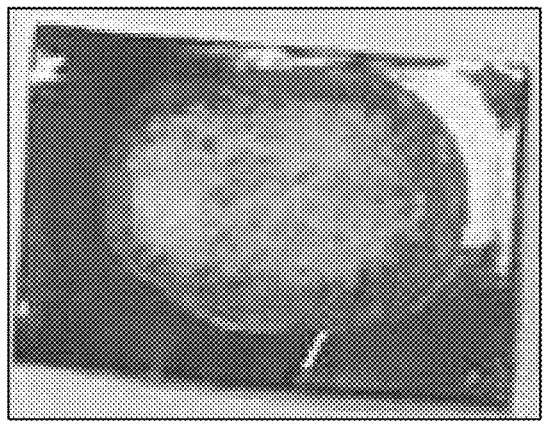
FIG. 11P is an image of a compatibility test of the copper sheet with the PEG/Sc—$SiO_2$ sample, according to certain embodiments.
Figure 11Q:
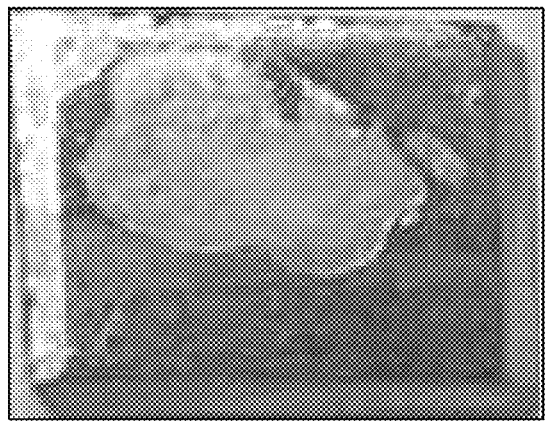
FIG. 11Q is an image of the compatibility test of the aluminum sheet with the PEG/Sc—$SiO_2$ sample, according to certain embodiments.
Figure 11R:
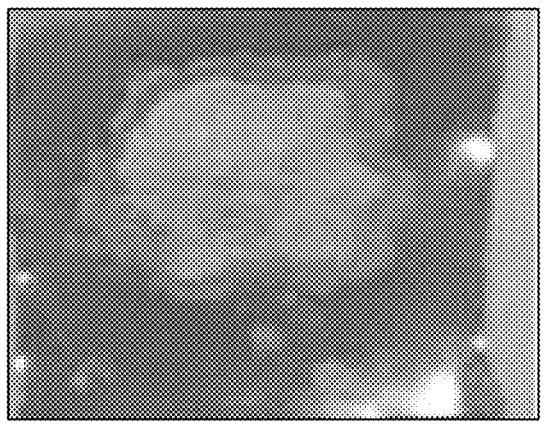
FIG. 11R is an image of the compatibility test of the zinc sheet with the PEG/Sc—$SiO_2$ sample, according to certain embodiments.
Figure 11S:
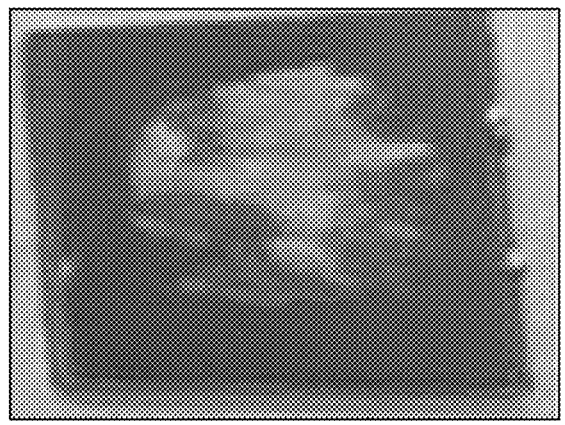
FIG. 11S is an image of the compatibility test of the stainless steel with the PEG/Sc—$SiO_2$ sample, according to certain embodiments.
Figure 11T:
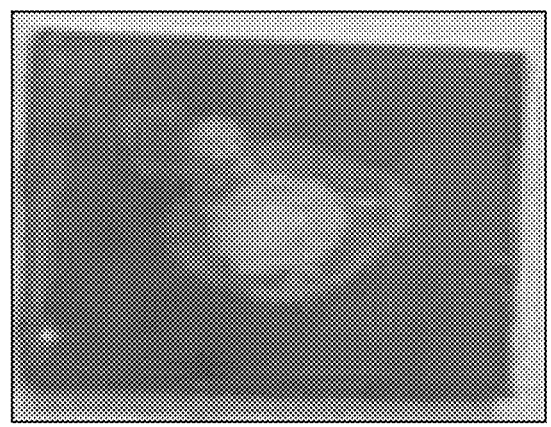
FIG. 11T is an image of the compatibility test of the galvanized iron sheet with the PEG/Sc—$SiO_2$ sample, according to certain embodiments.

The synthesized PCMs have to be stored in suitable containers for future use. Hence, compatibility of the synthesized PCMs with several metals used to fabricate containers was evaluated. Sheets of copper, aluminum, zinc, stainless steel, and galvanized iron (as shown in FIG. 11A, FIG. 11B, FIG. 11C, FIG. 11D and FIG. 11E, respectively) were coated with the relevant PCM and exposed to atmospheric conditions. The copper, aluminum, zinc, stainless steel, and galvanized iron sheets coated with the PEG/SiO$_2$ (FIGS. 11F-11J), the PEG/Zn—SiO$_2$ (FIGS. 11K-11O), and the PEG/Sc—SiO$_2$ (FIGS. 11P-11T) after four months of exposure to atmospheric conditions (June to September, with the highest temperature of about 50° C. and the lowest of about 15° C.) are illustrated in FIGS. 11F-11T. The PCM samples were placed on the sheets and surface properties were characterized after exposure under atmospheric conditions of high solar radiation and humidity for four months.

Color of the sheets that were in contact with the PEG/Zn—SiO$_2$ and PEG/Sc—SiO$_2$ PCMs did not change, indicating that the metal was not affected by the PEG/Zn—SiO$_2$ and PEG/Sc—SiO$_2$ PCMs. Further, the atmospheric exposure did not affect the weight of the samples. However, the color of the PEG/SiO$_2$ sample placed on the Cu sheet changes slightly, indicating that a container made of the Cu is not suitable to store the PEG/SiO$_2$. Thus, the results indicate that the PEG/Zn-SiO$_2$ and PEG/Sc—SiO$_2$ are compatible with the aluminum, zinc, stainless steel, and galvanized iron. The aluminum, zinc, stainless steel, and galvanized iron metals can be used as such to fabricate containers for long-term storage of the synthesized PCMs.

Figure 12A:
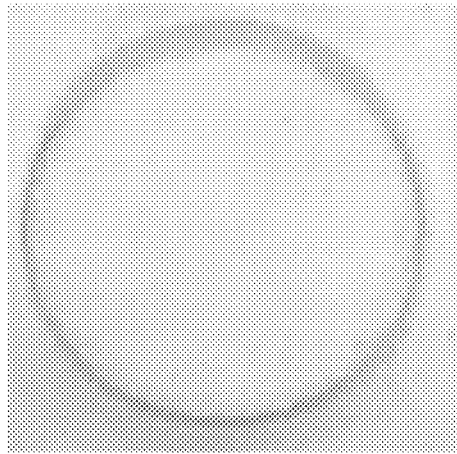
FIG. 12A is an image of the PEG sample considered for a seepage test at 25 degrees Celsius (25° C.), according to certain embodiments.
Figure 12B:
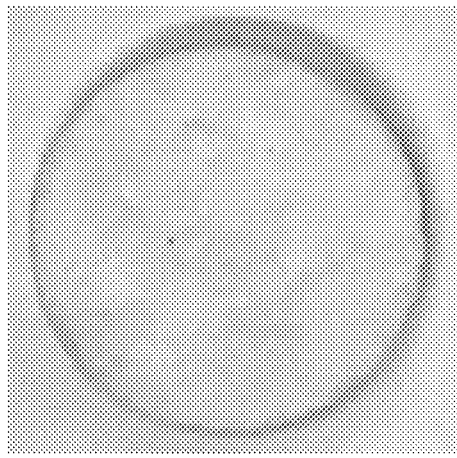
FIG. 12B is an image of the Sc—$SiO_2$ sample considered for the seepage test at 25° C., according to certain embodiments.
Figure 12C:
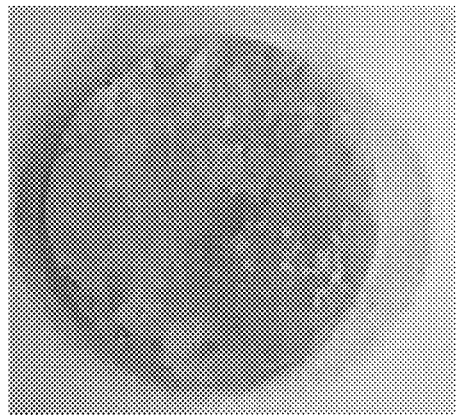
FIG. 12C is an image of the PEG/Sc—$SiO_2$ sample considered for the seepage test at 25° C., according to certain embodiments.
Figure 12D:
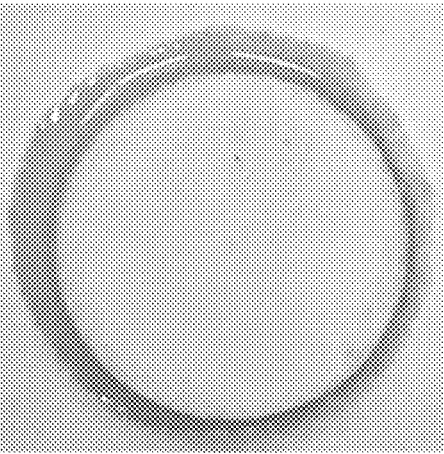
FIG. 12D is an image of the PEG sample considered for the seepage test at 70° C., according to certain embodiments.
Figure 12E:
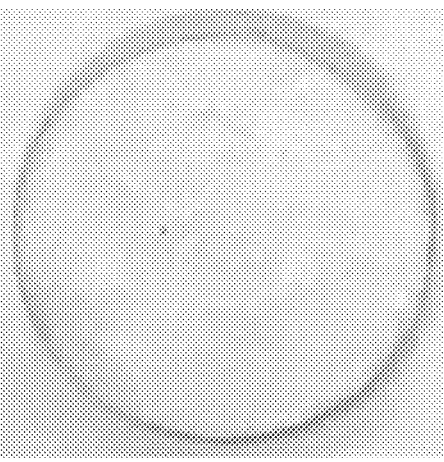
FIG. 12E is an image of the Sc—$SiO_2$ sample considered for the seepage test at 70° C., according to certain embodiments.
Figure 12F:
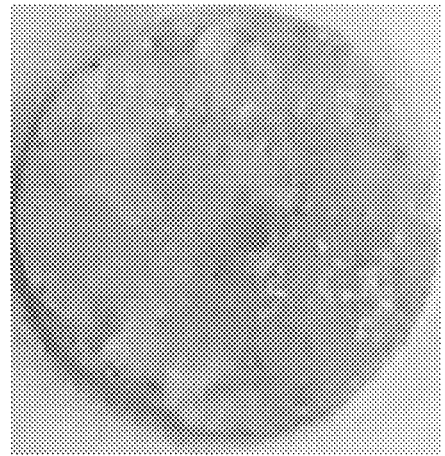
FIG. 12F is the image of the PEG/Sc—$SiO_2$ sample considered for the seepage test at 70° C., according to certain embodiments.

FIGS. 12A-FIG. 12C are images of the PEG, Sc—SiO$_2$, and PEG/Sc—SiO$_2$ samples, which were considered for a seepage test (leakage test) at 25° C. The PEG (FIG. 12A), Sc—SiO$_2$ (FIG. 12B) and (FIG. 12C), each were compressed into a disk of 20 mm diameter and placed on a filter paper on a laboratory heating platform. FIG. 12D-FIG. 12F show results of the samples after heating to 70° C. FIG. 12F shows that melting is not visible in the PEG/Sc—SiO$_2$, indicating that the PEG/Sc—SiO$_2$ leakage is absent even after heating the disk at 70° C. for 10 minutes, whereas, the PEG (FIG. 12D) starts to melt when heated to 70° C. From FIGS. 12A-12F, color shift rates of the PEG/Sc—SiO$_2$ were also implied. The color shift rates of the PEG/Sc—SiO$_2$ were different, implying that the heat transfer rates of the PEG/Sc—SiO$_2$ were different. After ten seconds, the PEG/Sc—SiO$_2$ demonstrates the fastest color change representing the fastest temperature shift, which indicates that the PEG/Sc—SiO$_2$ has the maximum thermal conductivity.

Figure 13A:
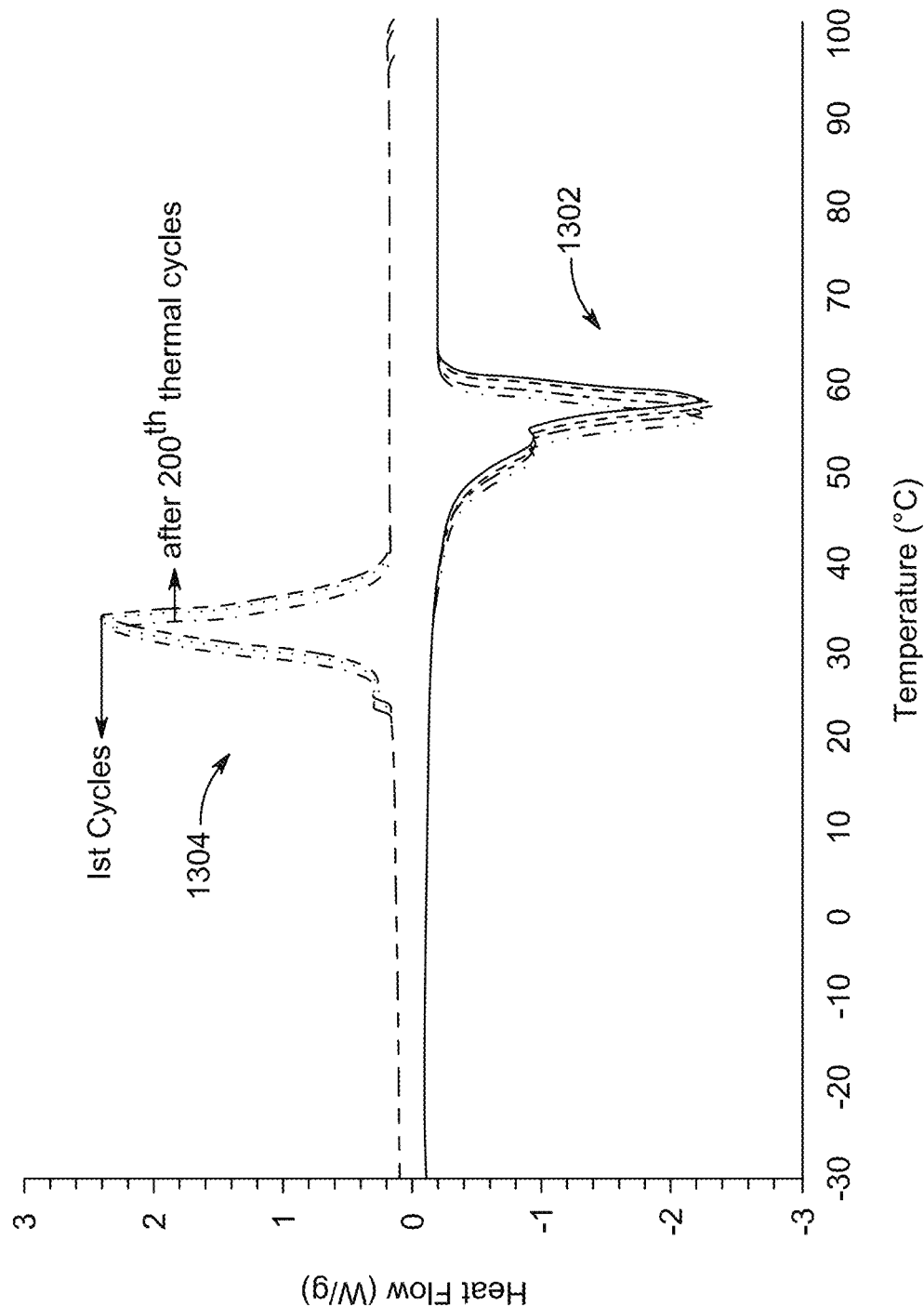
FIG. 13A is a graph depicting the DSC curve for melting and freezing enthalpies for the PEG/Sc—$SiO_2$ sample, repeated 200 times, according to certain embodiments.

The DSC data for the PEG/Sc—SiO$_2$ subjected to 200 thermal cycles is depicted in FIG. 13A. As shown in FIG. 13A, thermal cycling does not affect exothermic (1302) and endothermic peaks (1304), indicating that the PEG/Sc—SiO$_2$ has an efficient life cycle with high thermal stability. The DSC findings indicate that the PEG/Sc—SiO$_2$ can sustain virtually constant phase changes in terms of temperature and enthalpies. Hence, the PEG/Sc—SiO$_2$ can be used in applications involving repeated heating/cooling cycles to store and release latent heat at a constant temperature.

Figure 13B:
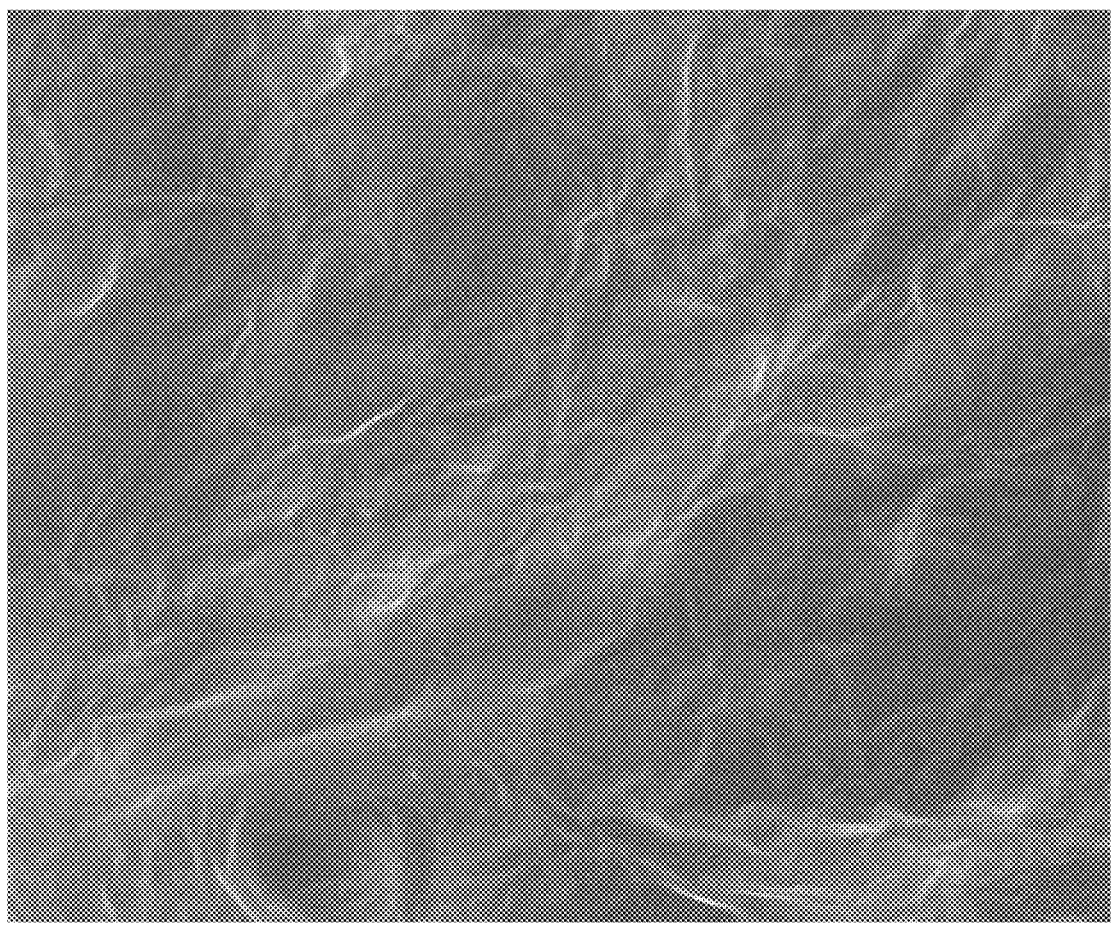
FIG. 13B is a FE-SEM image of the PEG/Sc—SiO$_2$ sample obtained after 200 thermal cycles, according to certain embodiments.

Shape of the PEG/Sc—SiO$_2$ remained the same after undergoing a reversible phase shift during cyclic heating and cooling experiments. An unchanged shape of the PEG/Sc—SiO$_2$ can be attributed to capillary action, and surface tension associated with the nano-porous structure of the silica limited the PEG leakage. A field emission scanning electron microscopy (FE-SEM) image obtained after 200 thermal cycles is depicted in FIG. 13B, which shows that structure of the PEG/Sc—SiO$_2$ remained the same even when subjected to vigorous thermal cycling. Even after 200 cycles, extra peaks are not observed in the DSC curves, and only minor shifts of the peaks in the melting and freezing curves are observed.

FIG. 13B reveals that the Sc—SiO$_2$ and PEG particles are efficiently mixed. The PEG/Sc—SiO$_2$ has a laminated structure, which can be efficient support for the Sc nanoparticles and PEG. In the ss-PCM, the PEG fills the pores in the SiO$_2$ network, confirming a quasi-uniform distribution of the PEG. Characteristic peaks in the FT-IR spectrum of the PEG/Sc—SiO$_2$ remain nearly unchanged after 200 thermal cycles indicating that the chemical structure of the PEG/Sc—SiO$_2$ is stable when subjected to thermal cycling, which indicates that the prepared the PEG/Sc—SiO$_2$ is structurally and chemically stable, which includes applications in providing comfort in buildings. Further, the XRD patterns before and after hydrothermal treatment remain unchanged, indicating that the PEG/Sc—SiO$_2$ is stable at 200° C. in the presence of 10% water vapor.

The PEG/Sc—SiO$_2$ can also be used for solar-to-thermal conversion and the TES. The PEG/Sc—SiO$_2$ or the porous structure of the Sc—SiO$_2$ enhances the visible light absorption of the PEG throughout a bandwidth and further increases the absorption at around ~350 nm. Enhanced full-band absorption and selective absorption provide the PEG/Sc—SiO$_2$ with efficient photothermal conversion efficiency. The intensity of the peaks in the ultraviolet-visible (UV-vis) absorption spectra of the PEG/Sc—SiO$_2$ is higher than that of the PEG alone. Using the present method, solar energy conversion into thermal energy and the energy storage capacity of the PCMs can be calculated simultaneously, considering the high latent heat and efficient optical properties. Further, the PEG/Sc—SiO$_2$ absorbs light across the entire visible region, which is higher than that of the PEG alone. Embedded temperature recorders were placed under the solar simulators to evaluate the solar energy conversion into thermal energy by the PEG and Sc—SiO$_2$.

Figure 14A:
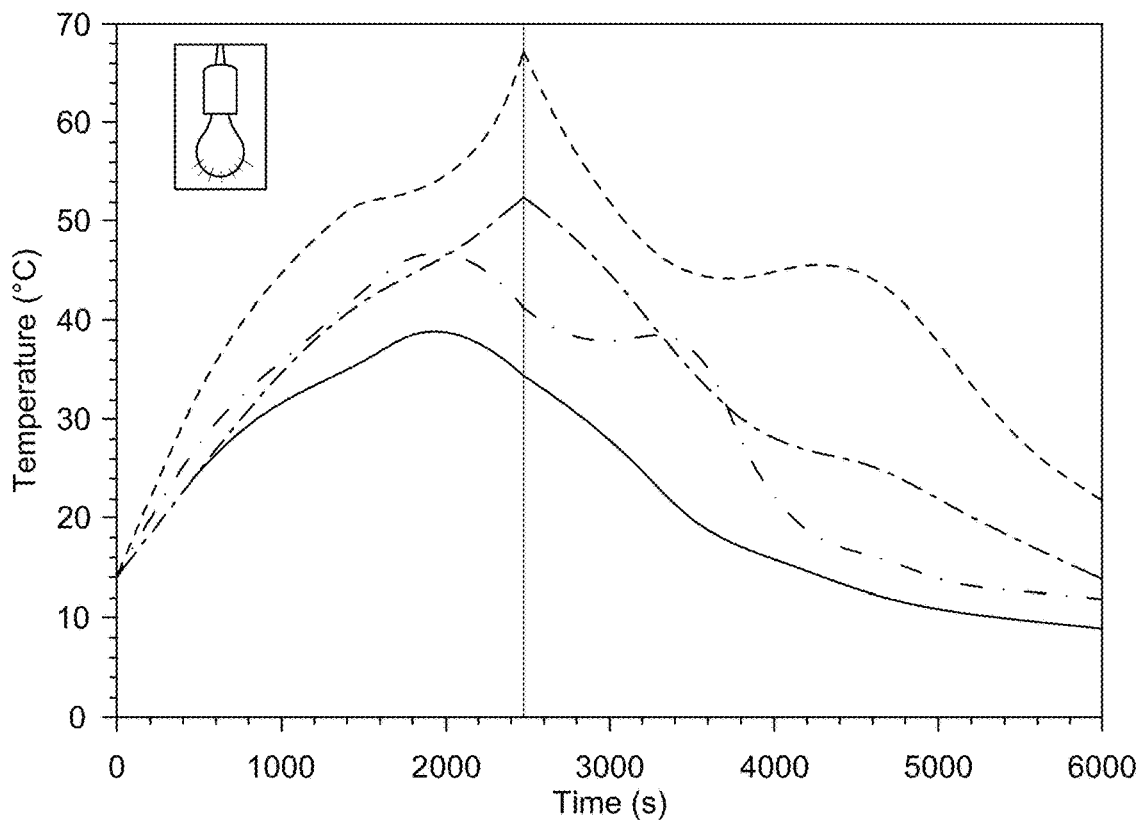
FIG. 14A is a graph depicting light-to-heat energy conversion curves of the PEG and ExP/CNT (0.5%) composites under solar simulator radiation (maximum power density (I) is 120 meters watt per square centimeter (mWcm$^{-2}$)), according to certain embodiments.

Formation of molecular stoves and photon emissions provides efficient activity to the Sc—SiO$_2$ or PEG, which further leads to an increase in the temperature (as shown in FIG. 14A). An increase in the temperature of the PEG can be attributed to infrared light in solar radiation. Under long-term radiation exposure, the desired value was observed, indicating the storage of thermal energy through a phase change. A cooling stage is present in the cooling process, which can be attributed to the release of energy.

Thermal energy heats the PCM composite, and the thermal energy is retained by the composites through phase changes of the PCMs. Equation 4 was used to determine the solar efficiency in the visible region for the TES.

$$\eta = \frac{m\Delta H}{IS(T_t - T_f)}; \quad (4)$$

where, $\eta$ is the energy storage efficiency, m is the weight of the sample, $\Delta H$ is the heat of the melting phase change, I is the optical power density, S is the radiated field, and $T_t$ and $T_f$ are the transition time points at the beginning and end of the phases.

Figure 14B:
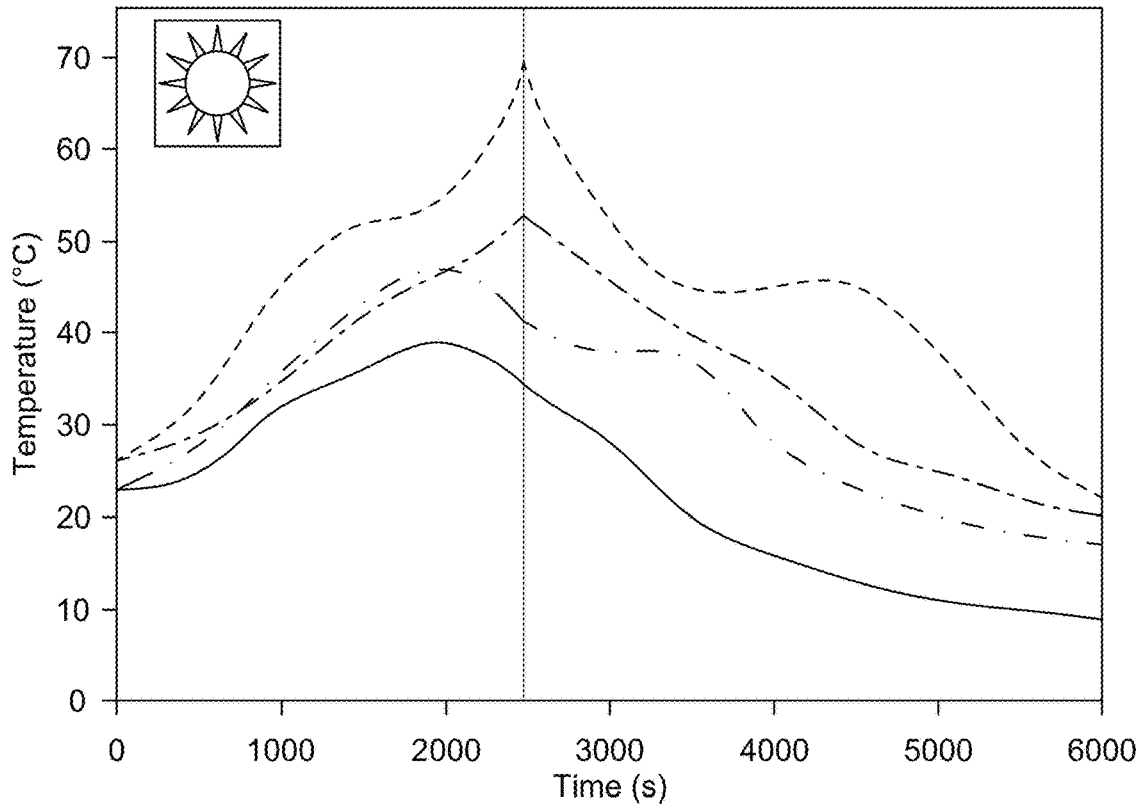
FIG. 14B is a graph depicting solar-to-thermal energy conversion curves of the PEG and ExP/CNT (0.5%) composites under irradiation with sunlight (I=98 mWcm$^{-2}$ for almost two hours).

Solar-to-thermal energy storage efficiency ($\eta$) of the PEG/SiO$_2$, PEG/Zn—SiO$_2$, and PEG/Sc—SiO$_2$, is 60.6%, 64.7%, and 75.5%, respectively. The PEG/SiO$_2$, PEG/Zn—SiO$_2$, and PEG/Sc—SiO$_2$ are efficient in storing photothermal energy. Performance and activity of the PEG/Sc—SiO$_2$ was evaluated by placing the PEG/Sc—SiO$_2$ in the sun. The temperature of the PCM increases after prolonged exposure to solar light, and the desired value was obtained for increasing and decreasing temperature, as shown in FIG. 14B. The device converts solar energy into heat energy through a phase transformation and can store energy. The high enthalpy of PEG/Sc—SiO$_2$ indicates that the fabricated PCM has a high thermal capacity to meet the requirements of practical applications.

The present disclosure provides a doped PCM whose thermal conductivity was enhanced by doping the SiO$_2$ support with Co, Ni, Zn, and Sc, which also improves the energy utilization efficiency and speeds up the charging and discharging rates. The Zn—SiO$_2$ and Sc—SiO$_2$ are efficient materials for solar energy conversion. The described PCMs have a high light-to-heat energy conversion capability, a high thermal conductivity, and the required stability to harness solar energy efficiently. The described PCMs also possess a low supercooling value and the capability of mitigating leakage problems to provide sustainable performance. The PEG has a low vapor pressure, efficient corrosion resistance, and chemical and thermal stabilities, is non-toxic, and inexpensive. The SiO$_2$ increases the form-stability of the PCM. Furthermore, the ZnO has efficient chemical and thermal stability, and the ZnO nanoparticles have high absorption in the UV spectrum over a wide range of wavelengths. Small amount of Sc$_2$O$_3$ and the ZnO particles in the prepared PCMs display efficient luminescence.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method to form a doped phase change material (PCM), comprising:
   mixing a dopant salt of at least one of a zinc nitrate and a scandium nitrate with tetraethyl orthosilicate (TEOS), in an organic solvent solution, to form a first solution;
   hydrolyzing and condensing the first solution, then adding an excess of water to form a second solution;
   mixing the second solution with nitric acid to form an acid solution;

adding a metal catalyst and a polymer to the acid solution to form the doped PCM, wherein the doped PCM comprises the metal catalyst, the polymer, at least one of zinc and scandium, and $SiO_2$, wherein the polymer is polyethylene glycol (PEG).

2. The method of claim 1, wherein the doped PCM has a phase change enthalpy of from 100 joules per gram (J/g) to 200 J/g.

3. The method of claim 1, wherein the doped PCM has a latent heat of from 150 J/g to 170 J/g.

4. The method of claim 1, wherein the doped PCM has a thermal conductivity of from 0.5 watts per meter per Kelvin ($W/m^{-1}K^{-1}$) to 0.7 ($W/m^{-1}K^{-1}$).

5. The method of claim 1, wherein the acid solution has a pH of 1.2.

6. The method of claim 1, wherein the acid is added over 30 minutes and the acid solution is mixed at a rate of 100 rotations per minute (rpm).

7. The method of claim 1, wherein the polymer is a polyethylene glycol (PEG) having an average molecular weight of 6000.

8. The method of claim 1, wherein the doped PCM has an energy storage efficiency of 79.93%.

9. The method of claim 1, wherein the doped PCM has a thermal conductivity of 0.6532 $W/m^{-1}K^{-1}$.

10. The method of claim 1, wherein the doped PCM consists of the metal catalyst, the polymer, at least one of a zinc nitrate and a scandium nitrate, and $SiO_2$.

11. The method of claim 1, wherein the doped PCM consists of the metal catalyst, the polymer, a zinc nitrate, and $SiO_2$.

12. The method of claim 1, wherein the doped PCM consists of the metal catalyst, the polymer, a scandium nitrate, and $SiO_2$.

13. The method of claim 1, wherein the doped PCM consists of the metal catalyst, the polymer, a zinc nitrate, a scandium nitrate, and $SiO_2$.

* * * * *